US010870425B2

(12) United States Patent
Kuhara

(10) Patent No.: US 10,870,425 B2
(45) Date of Patent: Dec. 22, 2020

(54) CONTROL DEVICE, CONTROL METHOD, AND RECORDING MEDIUM HAVING PROGRAM RECORDED THEREON FOR AUTOMATIC DRIVING VEHICLE

(71) Applicant: Panasonic Intellectual Property Corporation of America, Torrance, CA (US)

(72) Inventor: Shunsuke Kuhara, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 254 days.

(21) Appl. No.: 15/870,831

(22) Filed: Jan. 12, 2018

(65) Prior Publication Data

US 2018/0215376 A1    Aug. 2, 2018

(30) Foreign Application Priority Data

Jan. 30, 2017 (JP) ................. 2017-014713

(51) Int. Cl.
*B60W 30/06* (2006.01)
*G05D 1/02* (2020.01)
*B60W 30/00* (2006.01)
*G06K 9/00* (2006.01)
*G01C 21/34* (2006.01)
*G05D 1/00* (2006.01)
*G06Q 10/04* (2012.01)
*B62D 15/02* (2006.01)

(52) U.S. Cl.
CPC ............ *B60W 30/06* (2013.01); *B60W 30/00* (2013.01); *G01C 21/34* (2013.01); *G05D 1/0088* (2013.01);

(Continued)

(58) Field of Classification Search
None
See application file for complete search history.

(56) References Cited

U.S. PATENT DOCUMENTS 9,256,852 B1    2/2016  Myllymaki
9,547,307 B1 *  1/2017  Cullinane ............... E05F 15/70
(Continued)

FOREIGN PATENT DOCUMENTS

JP    2009-031196       2/2009
JP    2016-188788 A    11/2016
WO   2015/166811 A1   11/2015

OTHER PUBLICATIONS

The Extended European Search Report from the European Patent Office (EPO) dated Apr. 16, 2018 for the related European Patent Application No. 18153332.4.

(Continued)

*Primary Examiner* — Lail A Kleinman
(74) *Attorney, Agent, or Firm* — Greenblum & Bernstein, P.L.C.

(57) ABSTRACT

A control device of an automatic driving vehicle identifies an object, based on an image. The control device decides a first prohibited area, based on the object. A memory stores a first planned location as a planned location where the automatic driving vehicle is to park or stop. The control device determines whether or not the automatic driving vehicle is able to park or stop at the first planned location, based on the first prohibited area and first planned location. In a case where the automatic driving vehicle is not able to be parked or stopped at the first planned location, the control device changes the planned location from the first planned location to a second planned location, sets a route from a vehicle location to the second planned location, and controls movement of the automatic driving vehicle based on the route.

4 Claims, 26 Drawing Sheets

(52) U.S. Cl.
CPC ......... *G05D 1/0212* (2013.01); *G05D 1/0214* (2013.01); *G05D 1/0246* (2013.01); *G06K 9/00798* (2013.01); *G06K 9/00812* (2013.01); *B60K 2370/175* (2019.05); *B60W 2420/42* (2013.01); *B60W 2554/00* (2020.02); *B62D 15/0285* (2013.01); *G05D 2201/0213* (2013.01); *G06Q 10/047* (2013.01)

(56) References Cited

U.S. PATENT DOCUMENTS

| | | | |
|---|---|---|---|
| 2013/0166134 A1* | 6/2013 | Shitamoto | G05D 1/0223 701/26 |
| 2014/0330456 A1 | 11/2014 | Lopez Morales et al. | |
| 2015/0369621 A1* | 12/2015 | Abhyanker | G01C 21/3438 701/461 |
| 2016/0273922 A1 | 9/2016 | Stefan | |
| 2017/0011333 A1* | 1/2017 | Greiner | G06Q 10/083 |
| 2017/0123423 A1 | 5/2017 | Sako et al. | |

OTHER PUBLICATIONS

Communication pursuant to Article 94(3) EPC from the European Patent Office (EPO) dated May 6, 2019 for the related European Patent Application No. 18153332.4.

\* cited by examiner

FIG. 3

| PHOTOGRAPHED OBJECT | NONVIABLE PARKING/STOPPING AREA SETTING RULE |
|---|---|
| STOPPING/PARKING PROHIBITION SIGN | A SECTION OF ROAD WHERE A SIGN IS INSTALLED |
| PEDESTRIAN CROSSING | THE SECTION OF A PEDESTRIAN CROSSING, AND A SECTION WITHIN FIVE METERS OF EITHER SIDE OF A PEDESTRIAN CROSSING |
| BUS STOP DISPLAY POST | A SECTION WITHIN TEN METERS FROM THE LOCATION OF A DISPLAY POST |
| RAILWAY CROSSING | A SECTION WITHIN TEN METERS OF EITHER SIDE OF A RAILWAY CROSSING |

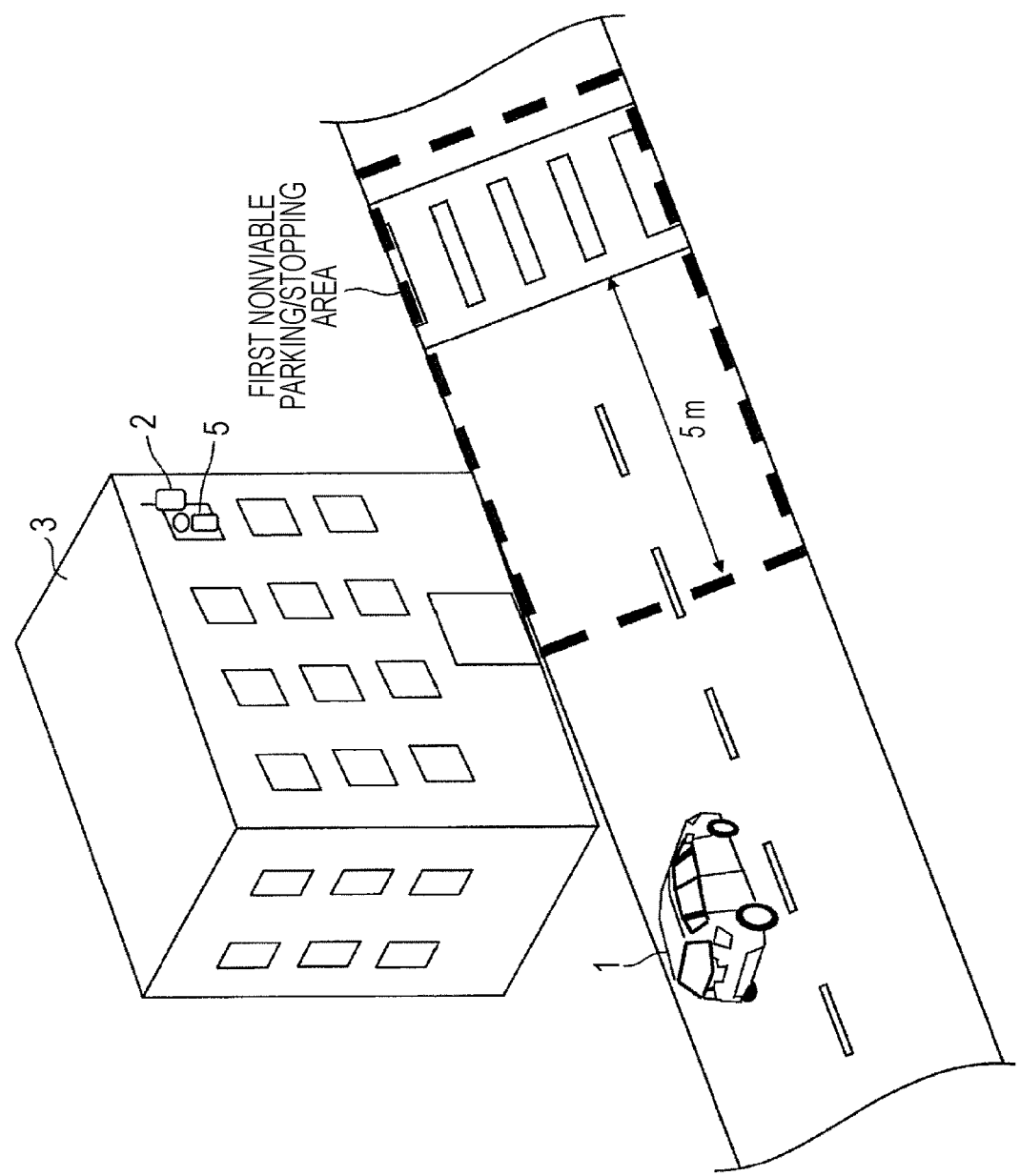

FIG. 17

| PHOTOGRAPHED OBJECT | NONVIABLE PARKING AREA SETTING RULE |
|---|---|
| ROADWORKS SIGN | A SECTION WITHIN FIVE METERS FROM A ROADWORKS SIGN |
| FIRE HYDRANT | A SECTION WITHIN FIVE METERS FROM THE LOCATION WHERE A FIRE HYDRANT IS INSTALLED |
| SIGN FOR A DESIGNATED FIRE-FIGHTING WATER SOURCE | A SECTION WITHIN FIVE METERS FROM THE LOCATION WHERE A SIGN FOR A DESIGNATED FIRE-FIGHTING WATER SOURCE IS INSTALLED |
| FIRE ALARM | A SECTION WITHIN ONE METER FROM A FIRE ALARM |

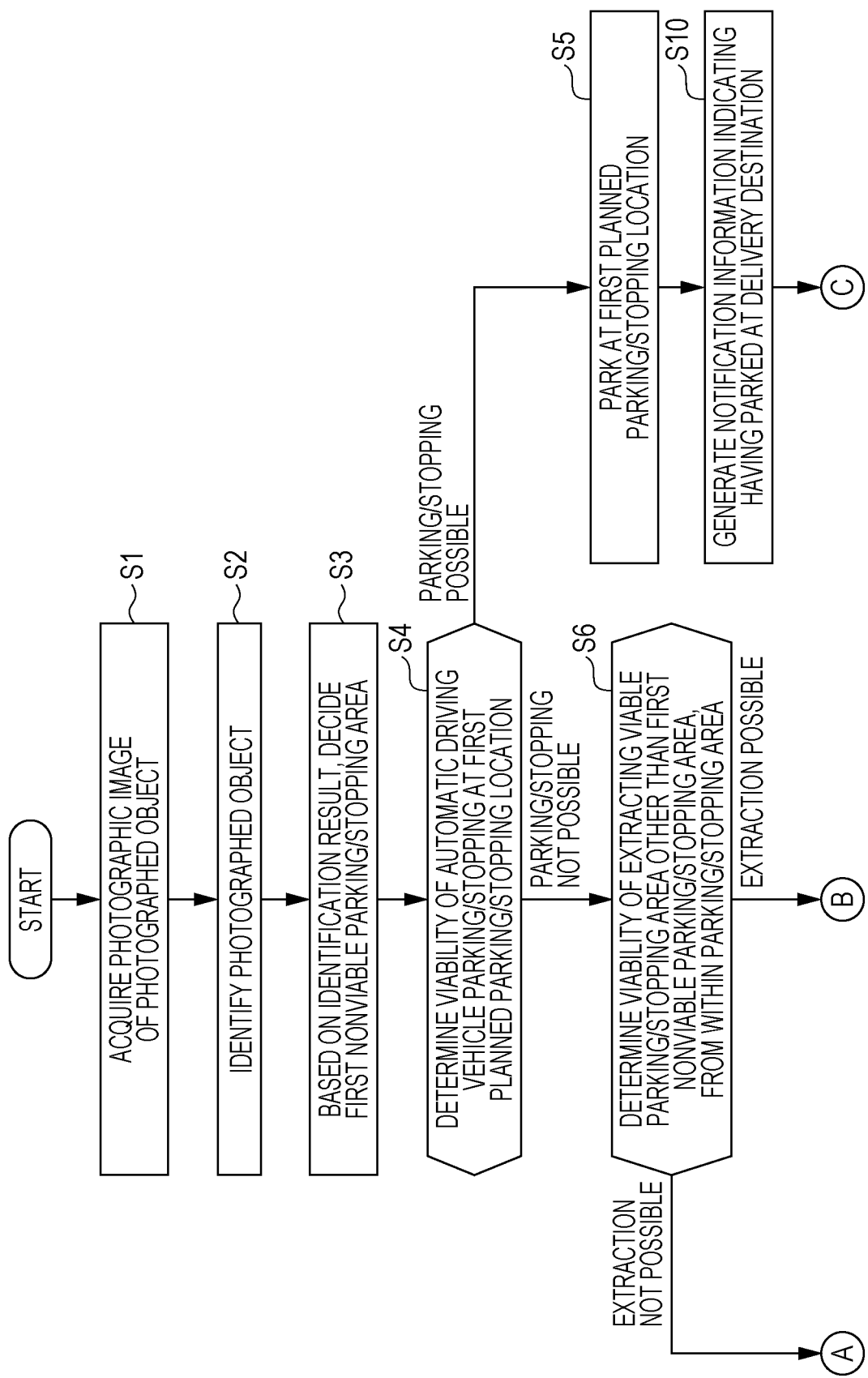

CONTROL DEVICE, CONTROL METHOD, AND RECORDING MEDIUM HAVING PROGRAM RECORDED THEREON FOR AUTOMATIC DRIVING VEHICLE

BACKGROUND

1. Technical Field

The present disclosure relates to a control device, a control method, and a recording medium having a program recorded thereon for an automatic driving vehicle.

2. Description of the Related Art

An online delivery system which uses an automatic driving vehicle that travels automatically in an unmanned manner has been proposed in recent years (for example, see the specification of U.S. Pat. No. 9,256,852). In this online delivery system, an automatic driving vehicle equipped with a locker travels from a delivery center to a package delivery destination (for example, in front of the home of a recipient). When the automatic driving vehicle has arrived at the package delivery destination, the recipient is able to get the package from the locker of the automatic driving vehicle by exiting his or her home and moving to the automatic driving vehicle.

In contrast, in the case of a delivery carried out using a vehicle driven by a delivery company driver, when the vehicle has arrived at the package delivery destination, the driver delivers the package to the entrance of the home of the recipient, and the recipient is thereby able to receive the package directly from the driver while being in his or her home.

Thus, in an online delivery system which uses an automatic driving vehicle, although the time and labor for the recipient increases, a delivery company driver is not required and therefore driver labor costs can be suppressed. As a result, the delivery fee can be set low compared to a delivery carried out using a vehicle driven by a driver. In particular, deliveries in time periods in which driver labor costs suddenly rise (for example, early morning, late at night, or the like) can be provided at a low cost. Furthermore, a recipient is able to receive a package without the address becoming known to a driver, and the personal information of the recipient can therefore be protected.

SUMMARY

In the aforementioned online delivery system which uses an automatic driving vehicle, the automatic driving vehicle parks or stops at the delivery destination in such a way that the recipient is able to receive the package at the delivery destination. However, in a case where the delivery destination is included in a parking/stopping prohibited area stipulated in the Road Traffic Act, there is a risk of the Road Traffic Act being violated due to the automatic driving vehicle parking or stopping at the delivery destination.

It should be noted that there is known technique for notifying a driver of a parking/stopping violation when the vehicle driven by the driver has parked or stopped in a parking/stopping prohibited area (for example, see Japanese Unexamined Patent Application Publication No. 2009-31196). However, this technique is targeted at a vehicle driven by a driver, and therefore cannot be applied to an automatic driving vehicle that travels in an unmanned manner.

One non-limiting and exemplary embodiment provides a control device, a control method, and a recording medium having a program recorded thereon for an automatic driving vehicle, with which the movement of the automatic driving vehicle can be controlled in a case where it is not possible for the automatic driving vehicle to be parked or stopped in a first planned parking/stopping location.

In one general aspect, the techniques disclosed here feature a control method of an automatic driving vehicle that comprises: acquiring a photographic image of a photographed object; identifying the photographed object, based on the photographic image; deciding a first prohibited area in which parking or stopping of the automatic driving vehicle is prohibited, based on the photographed object; storing, in a memory, a first planned location as a planned location where the automatic driving vehicle is to park or stop; determining whether or not the automatic driving vehicle is able to be parked or stopped at the first planned location, based on the first prohibited area and the first planned location; and in a case where the automatic driving vehicle is not able to be parked or stopped at the first planned location: changing the planned location where the automatic driving vehicle is to park or stop from the first planned location to a second planned location, based on a predetermined change condition; acquiring a vehicle location indicating the present location of the automatic driving vehicle; setting a route from the vehicle location to the second planned parking/stopping location; and controlling movement of the automatic driving vehicle, based on the route.

In accordance with the control method of the automatic driving vehicle according to the aspect of the present disclosure, in a case where it is not possible for the automatic driving vehicle to be parked or stopped in the first planned location, the planned location where the automatic driving vehicle is to park or stop is changed from the first planned location to the second planned location, and the automatic driving vehicle is made to autonomously move to the changed second planned location. It is thereby possible to suppress the automatic driving vehicle illegally parking or stopping at the first planned location.

It should be noted that general or specific aspects hereof may be realized by a system, a method, an integrated circuit, a computer program, or a recording medium such as a computer-readable CD-ROM (compact disc read-only memory), and may be realized by an arbitrary combination of a system, a method, an integrated circuit, a computer program, and a recording medium.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 3 is a diagram depicting an example of nonviable parking/stopping area setting rules based on the stipulations of the Road Traffic Act, Article 44;

FIG. 4 is a diagram depicting example 1 of a first nonviable parking/stopping area;

FIG. 17 is a diagram depicting an example of nonviable parking area setting rules based on the stipulations of the Road Traffic Act, Article 45;

FIGS. 23A and 23B are a flowchart depicting the flow of an operation of the automatic driving vehicle according to embodiment 2;

DETAILED DESCRIPTION

Figure 1:
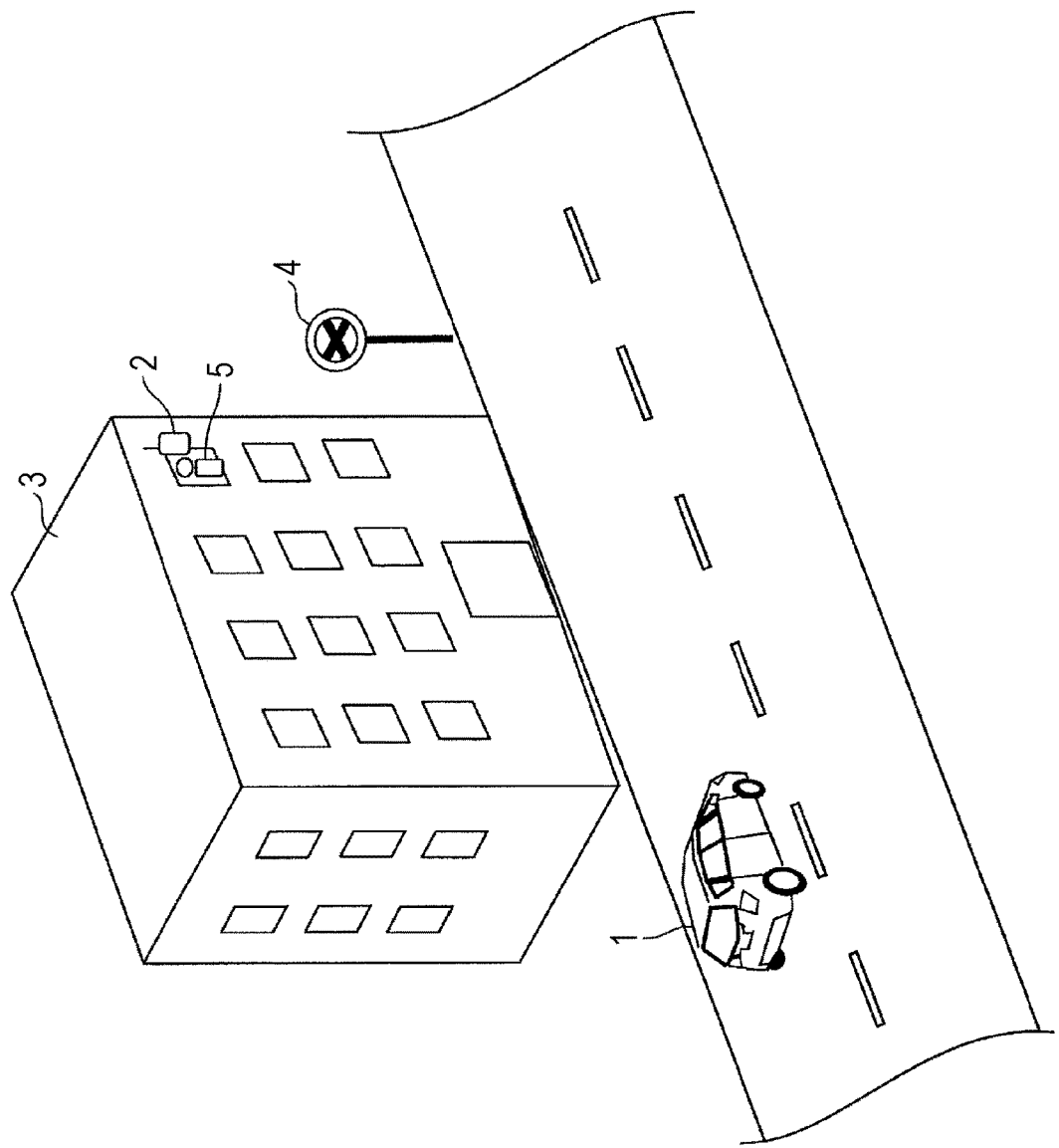
FIG. 1 is a conceptual diagram depicting an overall configuration of an online delivery system according to embodiment 1.

A control method of an automatic driving vehicle according to an aspect of the present disclosure comprises: acquiring a photographic image of a photographed object; identifying the photographed object, based on the photographic image; deciding a first prohibited area in which parking or stopping of the automatic driving vehicle is prohibited, based on the photographed object; storing, in a memory, a first planned location as a planned location where the automatic driving vehicle is to park or stop; determining whether or not the automatic driving vehicle is able to be parked or stopped at the first planned location, based on the first prohibited area and the first planned location; and in a case where the automatic driving vehicle is not able to be parked or stopped, changing the planned location where the automatic driving vehicle is to park or stop from the first planned location to a second planned location, based on a predetermined change condition; acquiring a vehicle location indicating the present location of the automatic driving vehicle; setting a route from the vehicle location to the second planned location; and controlling movement of the automatic driving vehicle, based on the route.

According the present aspect, in a case where it is not possible for the automatic driving vehicle to be parked or stopped in the first planned location, the planned location where the automatic driving vehicle is to park or stop is changed from the first planned location to the second planned location, and the automatic driving vehicle is made to autonomously move to the changed second planned location. It is thereby possible to suppress the automatic driving vehicle illegally parking or stopping at the first planned location.

A configuration may be adopted which, for example, further includes storing, in the memory, a predetermined area including the first planned location, in which the predetermined change condition is the condition that: an available area other than the first prohibited area within the predetermined area is decided, and a location at which, in a case where the automatic driving vehicle is parked or stopped, an area of the parked or stopped automatic driving vehicle does not overlap with the first prohibited area, and at which at least a portion of the area of the parked or stopped automatic driving vehicle is included in the available area, is decided as the second planned location.

According to the present aspect, in a case where, for example, the available area is the area designated as the delivery destination of the package, the second planned location is within the area designated as the delivery destination. The package can thereby be delivered to the delivery destination in accordance with the wishes of the recipient of the package.

A configuration may be adopted which, for example, further comprises: deciding a peripheral area of the first planned location, based on the first planned location; storing, in the memory, a second prohibited area that has been decided in advance in which parking or stopping of the automatic driving vehicle is prohibited, based on map information and a regulation relating to prohibition of parking or stopping, in which the predetermined change condition is the condition that: a location where it is possible for the automatic driving vehicle to park or stop in the peripheral area is decided as the second planned location, based on the decided peripheral area and the second prohibited area.

According to the present aspect, in a case where the planned location of the automatic driving vehicle cannot be changed in the available area, a location to be an alternative place for the first planned location is decided in the peripheral area of the first planned location, and the planned location of the automatic driving vehicle is changed to that place. Therefore, an attempt to change the planned location is carried out with the available area being prioritized. For example, in a case where the available area is the area designated as the delivery destination of the package, an attempt to change the planned location is carried out with the area designated as the delivery destination being prioritized, and the package can therefore be delivered in accordance with the wishes of the recipient of the package to the extent possible.

A configuration may be adopted which, for example, further comprises: storing, in the memory, a planned list including a plurality of planned locations at which the automatic driving vehicle is planned to sequentially park or stop, in which the predetermined change condition is the condition that: one of the plurality of planned locations at which the automatic driving vehicle is planned to park or stop after the first planned location is decided as the second planned location, based on the planned list.

According to the present aspect, the planned location of the automatic driving vehicle can be changed by means of a simple configuration. Furthermore, in a case where the times at which the automatic driving vehicle is to be parked or stopped at the plurality of planned locations are decided in advance, the automatic driving vehicle can be parked or stopped in accordance with the planned times, at a planned location other than the first planned location where it has been determined that parking or stopping is not possible.

A configuration may be adopted in which, for example, in the changing, in a case where the photographed object is identified as being a mobile body in the identifying, and the determining determines that the automatic driving vehicle is not able to be parked or stopped, the planned location where the automatic driving vehicle is to park or stop is not changed from the first planned location to the second planned location, and the control method further comprises: setting a second route from the vehicle location to the first planned location; and controlling the movement of the automatic driving vehicle, based on the second route, to return to the first planned location after a predetermined period has elapsed.

According to the present aspect, since another mobile body has parked or stopped at the first planned location, it can be autonomously determined that it is not possible for the automatic driving vehicle to temporarily park or stop, and the movement of the automatic driving vehicle can be controlled in such a way that the automatic driving vehicle once again arrives at the first planned location after a predetermined period has elapsed. In addition, the processing for the automatic driving vehicle can be simplified since the planned location of the automatic driving vehicle does not have to be changed.

A configuration may be adopted in which, for example, the automatic driving vehicle is for delivering a package to a delivery destination, and the control method further comprises: storing, in advance in the memory, a terminal address of a recipient terminal operated by a recipient of the package; generating first notification information indicating that the planned location where the automatic driving vehicle is to park or stop has been changed from the first planned location to the second planned location; and transmitting the first notification information to the recipient terminal, based on the terminal address.

According to the present aspect, in a case where it is not possible for the automatic driving vehicle to be parked or stopped at the first planned location, the recipient at the delivery destination is able to comprehend that the planned location of the automatic driving vehicle has been changed.

A configuration may be adopted which, for example, further comprises: generating second notification information indicating a reason for changing the planned location where the automatic driving vehicle is to park or stop; and transmitting the second notification information to the recipient terminal, based on the terminal address.

According to the present aspect, in a case where, for example, the reason for the planned location of the automatic driving vehicle having been changed is the reason that the first planned location is included in the first prohibited area, the recipient at the delivery destination is able to recognize that it is not possible to receive the package at the first planned location. However, in a case where the reason for the planned location of the automatic driving vehicle having been changed is the reason that another vehicle has parked or stopped at the first planned location, the recipient at the delivery destination is able to recognize that there are the two options of (a) changing the delivery time and having the automatic driving vehicle carry out the delivery once again to the first planned location, or (b) having the automatic driving vehicle park or stop at a different place.

A configuration may be adopted which, for example, further comprises: storing, in the memory, a predetermined area including the first planned location, and in a case where the second planned location is included within the predetermined area, not transmitting the first notification information to the recipient terminal.

According to the present aspect, in a case where it is possible to carry out a delivery that corresponds to the wishes of the recipient of the package, it is not necessary to notify the recipient that the planned location of the automatic driving vehicle is to be changed, and therefore the notification processing performed by the notification control unit can be omitted.

A configuration may be adopted which, for example, further comprises: generating second notification information indicating the second planned location; and transmitting the second notification information to the recipient terminal, based on the terminal address.

According to the present aspect, the recipient is able to comprehend the second planned location on the basis of the second notification information, and is able to go to receive the package at the second planned location at which the automatic driving vehicle has parked or stopped.

A configuration may be adopted which, for example, further comprises: deciding a prohibited parking area in which parking of the automatic driving vehicle is prohibited, based on the photographed object; in a case where the automatic driving vehicle is able to be parked or stopped, determining whether or not the automatic driving vehicle is able to park at the first planned location, based on the prohibited parking area and the first planned location; in a case where the automatic driving vehicle is not able to park, generating second notification information indicating that the automatic driving vehicle is able to stop at the first planned location only for a predetermined period; and transmitting the second notification information to the recipient terminal, based on the terminal address.

According to the present aspect, the recipient is able to comprehend that the automatic driving vehicle can only stop for a predetermined period at the first planned location. The recipient is thereby able to recognize that it is necessary to get the package within the predetermined period during which the automatic driving vehicle will be stopped.

A configuration may be adopted which, for example, further comprises: in the case where the automatic driving vehicle is not able to park, causing the automatic driving vehicle to stop at the first planned location during the predetermined period.

According to the present aspect, the automatic driving vehicle is made to stop for the predetermined period at the first planned location, and it is therefore possible to prevent the automatic driving vehicle illegally parking at the first planned location.

A configuration may be adopted which, for example, further comprises: generating second notification information prompting the recipient to select a delivery method for the package; and transmitting the second notification information to the recipient terminal, based on the terminal address.

According to the present aspect, in accordance with the planned location of the automatic driving vehicle having been changed, a query is issued to the recipient regarding selecting (changing) the delivery method for the package, and therefore the package can be delivered by means of a delivery method that corresponds to the wishes of the recipient.

A configuration may be adopted which, for example, further comprises: when selection information of the recipient regarding the second notification information is received from the recipient terminal, controlling the movement of the automatic driving vehicle, based on the selection information.

According to the present aspect, the movement of the automatic driving vehicle is controlled on the basis of the response of the recipient, and therefore the package can be delivered by means of a delivery method that corresponds to the wishes of the recipient.

A configuration may be adopted in which, for example, in the acquiring of the photographic image, the photographic image is acquired in response to the vehicle location of the automatic driving vehicle being within a range of a predetermined distance from the first planned location.

According to the present configuration, it is possible for the aforementioned processing to not be carried out in places that are far away from the first planned location. It is thereby possible to suppress a processing resource such as a CPU (central processing unit) from being wasted.

A configuration may be adopted in which, for example, the photographic image of the photographed object is acquired by a camera.

A configuration may be adopted in which, for example, the automatic driving vehicle is for delivering a package to a delivery destination, and the control method further comprises: calculating a movement time of the automatic driving vehicle; calculating an arrival time of the automatic driving vehicle at the first planned location, based on the movement time; and notifying a recipient of the package of the arrival time of the automatic driving vehicle at the first planned location.

A configuration may be adopted in which, for example, the arrival time of the automatic driving vehicle at the first planned location corresponds to a second arrival at the first planned location, and the movement of the automatic driving vehicle is controlled based on the route to the second planned location before the arrival time.

A control device of an automatic driving vehicle according to an aspect of the present disclosure comprises: an identifier that acquires a photographic image of a photographed object, and identifies the photographed object, based on the photographic image; a decider that decides a first prohibited area in which parking or stopping of the automatic driving vehicle is prohibited, based on the photographed object; a memory that stores a first planned location as a planned location where the automatic driving vehicle is to park or stop; a determiner that determines whether or not the automatic driving vehicle is able to be parked or stopped at the first planned location, based on the first prohibited area and the first planned location; a changer that, in a case where the automatic driving vehicle is not able to be parked or stopped at the first planned location, changes the planned location where the automatic driving vehicle is to park or stop, from the first planned location to a second planned location, based on a predetermined change condition; and a controller that, in a case where the planned location is changed to the second location, acquires a vehicle location indicating the present location of the automatic driving vehicle, sets a route from the vehicle location to the second planned location, and controls movement of the automatic driving vehicle, based on the route.

According the present aspect, in a case where it is not possible for the automatic driving vehicle to be parked or stopped in the first planned location, the planned location where the automatic driving vehicle is to park or stop is changed from the first planned location to the second planned location, and the automatic driving vehicle is made to autonomously move to the changed second planned location. It is thereby possible to suppress the automatic driving vehicle illegally parking or stopping at the first planned location.

A computer-readable non-transitory recording medium according to an aspect of the present disclosure includes a program that controls an automatic driving vehicle recorded thereon, the program, when executed by a computer, causing execution of a method comprising: acquiring a photographic image of a photographed object photographed; identifying the photographed object, based on the photographic image; deciding a first prohibited area in which parking or stopping of the automatic driving vehicle is prohibited, based on the photographed object; storing, in a memory, a first planned location as a planned location where the automatic driving vehicle is to park or stop; determining whether or not the automatic driving vehicle is able to be parked or stopped at the first planned location, based on the first prohibited area and the first planned location; and in a case where the automatic driving vehicle is not able to be parked or stopped at the first planned location: changing the planned location where the automatic driving vehicle is to park or stop, from the first planned location to a second planned location, based on a predetermined change condition; acquiring a vehicle location indicating the present location of the automatic driving vehicle; setting a route from the vehicle location to the second planned location; and controlling movement of the automatic driving vehicle, based on the route.

According the present aspect, in a case where it is not possible for the automatic driving vehicle to be parked or stopped in the first planned location, the planned location where the automatic driving vehicle is to park or stop is changed from the first planned location to the second planned location, and the automatic driving vehicle is made to autonomously move to the changed second planned location. It is thereby possible to suppress the automatic driving vehicle illegally parking or stopping at the first planned location.

A control device of an automatic driving vehicle according to an aspect of the present disclosure comprises: processing circuitry; and a memory including at least one set of instructions that, when executed by the processing circuitry, causes the processing circuitry to perform operations including: acquiring a photographic image of a photographed object; identifying the photographed object, based on the photographic image; deciding a first prohibited area in which parking or stopping of the automatic driving vehicle is prohibited, based on the photographed object; storing, in the memory, a first planned location as a planned location where the automatic driving vehicle is to park or stop; determining whether or not the automatic driving vehicle is able to be parked or stopped at the first planned location, based on the first prohibited area and the first planned location; and in a case where the automatic driving vehicle is not able to be parked or stopped at the first planned location: changing the planned location where the automatic driving vehicle is to park or stop from the first planned location to a second planned location, based on a predetermined change condition; acquiring a vehicle location indicating a present location of the automatic driving vehicle; setting a route from the vehicle location to the second planned location; and controlling movement of the automatic driving vehicle, based on the route.

It should be noted that general or specific aspects hereof may be realized by a system, a method, an integrated circuit, a computer program, or a recording medium such as a computer-readable CD-ROM, and may be realized by an arbitrary combination of a system, a method, an integrated circuit, a computer program, or a recording medium.

Hereinafter, embodiments will be described in a specific manner with reference to the drawings.

It should be noted that the embodiments described hereinafter all represent general or specific examples. The numerical values, the shapes, the materials, the constituent elements, the arrangement positions and modes of connection of the constituent elements, the steps, the order of the steps, and the like given in the following embodiments are examples and are not intended to restrict the present disclosure. Furthermore, from among the constituent elements in the following embodiments, constituent elements that are not mentioned in the independent claims indicating the most significant concepts are described as optional constituent elements.

Embodiment 1

1-1. Overall Configuration of Online Delivery System

First, an overall configuration of an online delivery system according to embodiment 1 will be described with reference to FIG. 1. FIG. 1 is a conceptual diagram depicting the overall configuration of the online delivery system according to embodiment 1.

The online delivery system according to embodiment 1 is a system in which goods (a package) are delivered to a delivery destination by an automatic driving vehicle 1 as part of online shopping, for example. As depicted in FIG. 1, the online delivery system is provided with the automatic driving vehicle 1 and a recipient terminal 2 that communicates with the automatic driving vehicle 1 via a network such as the Internet.

FIG. 1 depicts the way in which the automatic driving vehicle 1 arrives at the periphery of a building 3 at the delivery destination, and attempts to park or stop at a first planned parking/stopping location (described later on) that is stored in advance. A road sign 4 indicating the prohibition of parking or stopping has been installed in the periphery of the building 3 at the delivery destination. A recipient 5 of the package resides at the building 3 at the delivery destination, and the recipient 5 has the recipient terminal 2.

The automatic driving vehicle 1 is a vehicle that automatically travels in an unmanned manner by means of a travel program, and is equipped with a locker or the like for housing a plurality of packages. The automatic driving vehicle 1 acquires a photographic image by photographing a photographed object (for example, the road sign 4 or the like) in the periphery of the automatic driving vehicle 1, and identifies the photographed object from the photographic image. In addition, the automatic driving vehicle 1 decides a first nonviable parking/stopping area (described later on) that indicates an area in which it is prohibited for the automatic driving vehicle 1 to park or stop, on the basis of the identification result for the photographed object, and determines whether or not it is possible to park or stop at the first planned parking/stopping location, on the basis of the first nonviable parking/stopping area and the first planned parking/stopping location, which is stored in advance. In addition, the automatic driving vehicle 1, when having determined that it is not possible to park or stop at the first planned parking/stopping location, changes the planned location for parking or stopping (a planned parking/stopping location) from the first planned parking/stopping location to a second planned parking/stopping location (described later on) on the basis of a predetermined change condition, and notifies the recipient terminal 2.

The recipient terminal 2 is a terminal operated by the recipient 5, and, for example, is a cellular telephone, a smartphone, a tablet terminal, a personal computer, or the like. The recipient terminal 2, for example, has a function to display a notification from the automatic driving vehicle 1 to the recipient 5, a function to receive an input operation performed by the recipient 5, and a function to communicate with the automatic driving vehicle 1.

Hereinafter, configurations of the automatic driving vehicle 1 and the recipient terminal 2 will be described in detail.

1-2. Functional Configuration of Automatic Driving Vehicle

Figure 2:
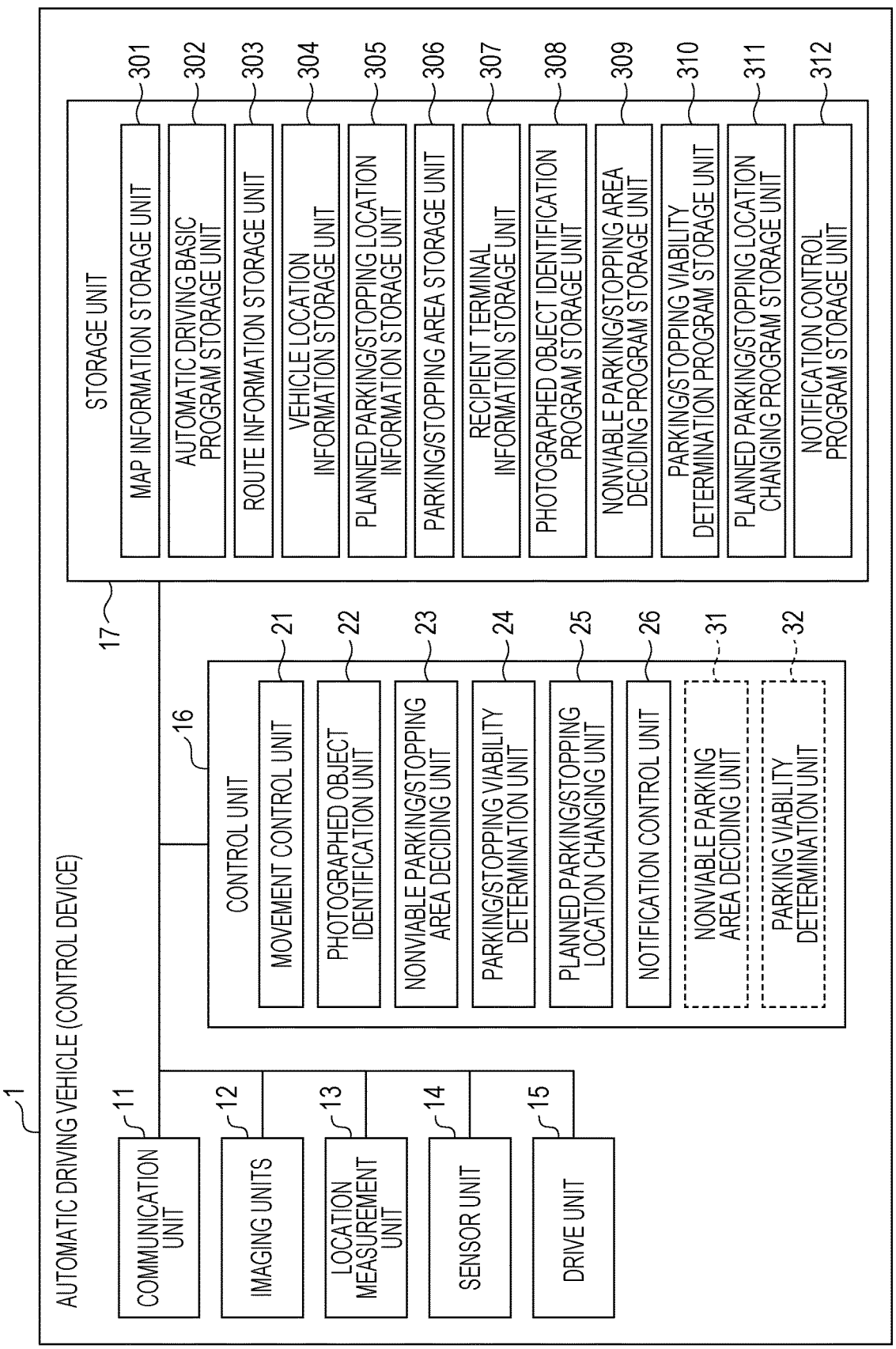
FIG. 2 is a block diagram depicting a functional configuration of an automatic driving vehicle according to embodiment 1.

First, a functional configuration of the automatic driving vehicle 1 (a control device of the automatic driving vehicle 1) will be described with reference to FIG. 2. FIG. 2 is a block diagram depicting the functional configuration of the automatic driving vehicle 1 according to embodiment 1.

As depicted in FIG. 2, the automatic driving vehicle 1 is provided with a communication unit 11, imaging units 12, a location measurement unit 13, a sensor unit 14, a drive unit 15, a control unit 16, and a storage unit 17.

The communication unit 11 transmits various information to a communication unit 41 (see FIG. 12 described later on) of the recipient terminal 2, and receives various information from the communication unit 41 of the recipient terminal 2.

The imaging units 12 are cameras for photographing a photographed object in the periphery of the automatic driving vehicle 1. For example, a plurality of the imaging units 12 are mounted on the automatic driving vehicle 1, and are respectively attached to the front-end section, rear-end section, right-side section, and left-side section of the automatic driving vehicle 1, for example. It should be noted that the locations where the imaging units 12 are mounted and the number to be mounted are not restricted to the aforementioned configuration as long as a configuration is adopted in which it is possible to photograph a photographed object in the periphery of the automatic driving vehicle 1. For example, instead of a configuration in which one of the imaging units 12 is attached to the right-side section (left-side section) of the automatic driving vehicle 1, a configuration may be adopted in which two of the imaging units 12 are respectively attached to the two positions of the right front-end section (left front-end section) and the right rear-end section (left rear-end section) of the automatic driving vehicle 1.

The location measurement unit 13 is, for example, configured from a GPS (Global Positioning System) receiver or the like, and periodically measures and acquires information relating to a vehicle location indicating the present location of the automatic driving vehicle 1. The information relating to the vehicle location is represented by latitude and longitude, for example.

The sensor unit 14 senses information relating to the peripheral environment of the automatic driving vehicle 1, and information relating to the state of the automatic driving vehicle 1.

It should be noted that sensors that sense information relating to the peripheral environment of the automatic driving vehicle 1 include, for example, LIDAR (Light Detection and Ranging) and millimeter-wave radar sensors. LIDAR detects distance and relative speed with respect to a peripheral object by measuring the time from an infrared laser being radiated to being reflected by the object and returning. It is thereby possible to read a three-dimensional structure of the peripheral environment. Furthermore, with millimeter-wave radar, a measurement that is similar to that of LIDAR is performed but the measurement uses radio waves rather than infrared radar. LIDAR in which infrared radar is used can be employed even at night; however, the functionality declines in bad weather. In contrast, millimeter-wave radar in which radio waves are used, although having a resolution that is inferior to that of LIDAR, enables detection regardless of the weather and complements cases where measurement is not possible with LIDAR.

Sensors that sense information relating to the state of the automatic driving vehicle 1 include odometers, inertial sensors, or the like. An odometer measures the distance advanced by the automatic driving vehicle 1 by measuring the number of tire revolutions. An inertial sensor is a sensor for detecting the amount of inertial movement, configured from a triaxial angular velocity sensor and a three-directional acceleration sensor, and detects the behavior of the automatic driving vehicle 1.

The drive unit 15 is, for example, an engine and a transmission in a case where the automatic driving vehicle 1 is an engine vehicle. Furthermore, the drive unit 15 is, for example, a traveling motor and a transmission in a case where the automatic driving vehicle 1 is an electric automobile (battery vehicle) in the narrow sense. In either of the engine and traveling motor, starting and stopping are carried out by way of an ignition switch.

The control unit 16 is constituted by a CPU, for example. The control unit 16 is provided with a movement control unit 21, a photographed object identification unit 22, a nonviable parking/stopping area deciding unit 23, a parking/stopping viability determination unit 24, a planned parking/stopping location changing unit 25, and a notification control unit 26.

The movement control unit 21 controls the movement of the automatic driving vehicle 1 on the basis of an automatic driving basic program stored in an automatic driving basic program storage unit 302 (described later on). Specifically, the movement control unit 21 decides a movement direction for the automatic driving vehicle 1 on the basis of a route stored in a route information storage unit 303 (described later on) and a vehicle location acquired by the location measurement unit 13, and causes the automatic driving vehicle 1 to move in the decided movement direction on the basis of the automatic driving basic program.

The photographed object identification unit 22 identifies a photographed object that has been photographed by the imaging units 12, on the basis of a photographed object identification program stored in a photographed object identification program storage unit 308 (described later on). The photographed object identification unit 22 identifies the photographed object by, for example, causing pattern matching to be performed between image templates stored in advance and the photographic image of the photographed object. It should be noted that, for the pattern matching between the image templates and the photographic image of the photographed object, a configuration is preferable in which machine learning is used for the photographed object to be identified with a higher degree of accuracy. For the learning data used for the machine learning, a configuration is preferable in which learning data including not only data of the vehicle in question but also data of other vehicles is used. These sets of learning data can be acquired from, for example, an external server (not depicted) that is a management device for accumulating learning data, via the communication unit 11.

The nonviable parking/stopping area deciding unit 23 decides the first nonviable parking/stopping area indicating an area in which parking or stopping of the automatic driving vehicle 1 is prohibited, on the basis of a nonviable parking/stopping area deciding program stored in a nonviable parking/stopping area deciding program storage unit 309 (described later on). Specifically, the nonviable parking/stopping area deciding unit 23 stores, in advance, nonviable parking/stopping area setting rules for each photographed object, and decides the first nonviable parking/stopping area from the photographed object identified by the photographed object identification unit 22, on the basis of the nonviable parking/stopping area setting rules. The nonviable parking/stopping area setting rules have a configuration that includes at least (a) a rule for setting the first nonviable parking/stopping area on the basis of a law relating to the prohibition of parking or stopping, and (b) a rule for setting the area in which the photographed object is present as the first nonviable parking/stopping area. The nonviable parking/stopping area setting rules are decided in advance by an administrator or the like of the system.

The law relating to the prohibition of parking or stopping includes, for example, in the case of Japan, stipulations relating to the prohibition of parking or stopping in the Road Traffic Act, Article 44. FIG. 3 is a diagram depicting an example of nonviable parking/stopping area setting rules based on the stipulations of the Road Traffic Act, Article 44. In the example depicted in FIG. 3, in a case where the photographed object is a "pedestrian crossing", for a nonviable parking/stopping area setting rule, "the section of a pedestrian crossing, and a section within five meters of either side of a pedestrian crossing" is set on the basis of stipulations (i) and (iii) of the Road Traffic Act, Article 44.

FIG. 4 is a diagram depicting example 1 of the first nonviable parking/stopping area. In the example depicted in FIG. 4, in a case where the photographed object is a "pedestrian crossing", the first nonviable parking/stopping area (the area indicated by the dashed line) is set on the basis of the nonviable parking/stopping area setting rules depicted in FIG. 3.

Figure 5:
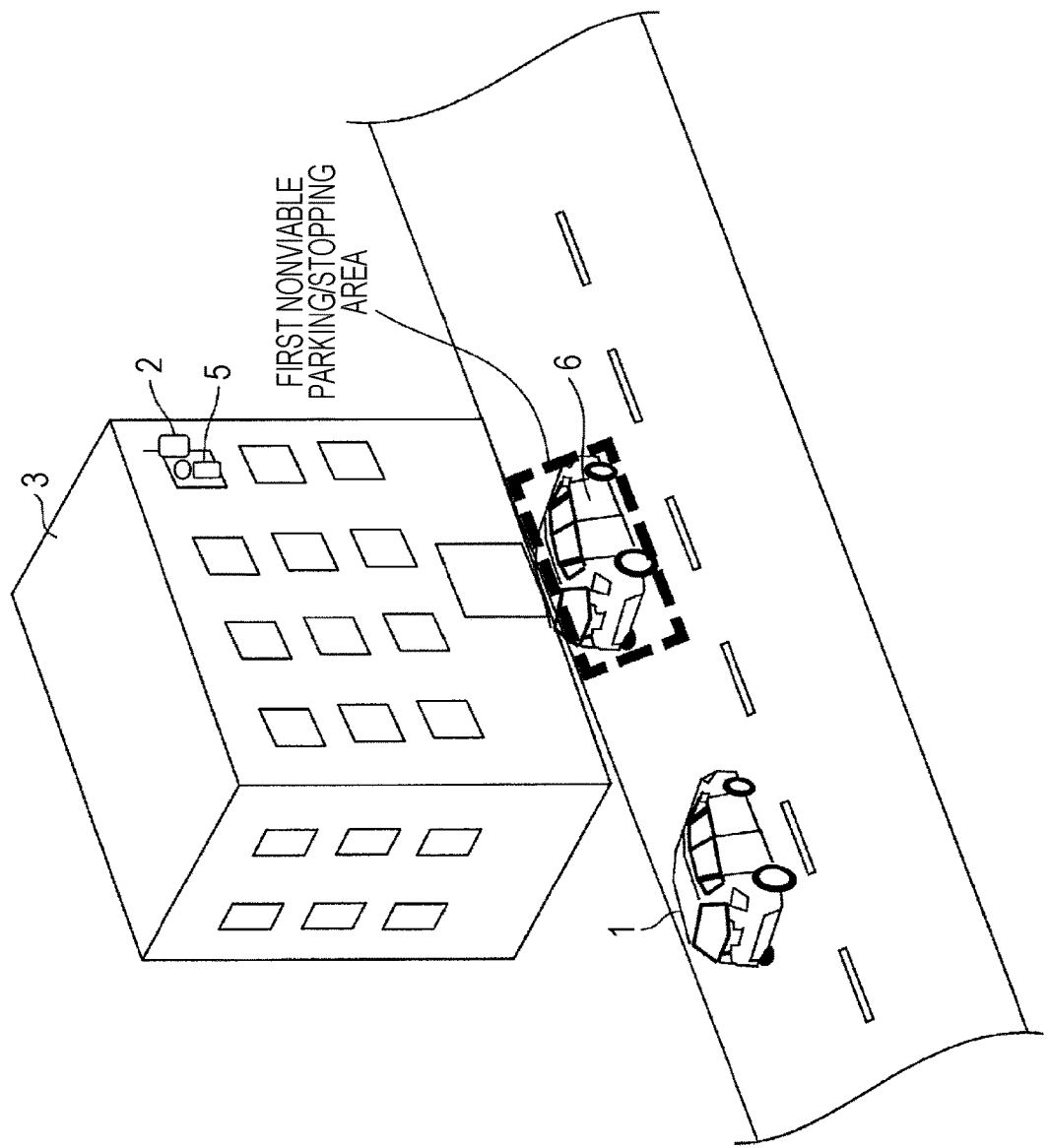
FIG. 5 is a diagram depicting example 2 of the first nonviable parking/stopping area.

Furthermore, the rule for setting the area in which the photographed object is present as the first nonviable parking/stopping area is a rule that becomes necessary due to the automatic driving vehicle 1 not being able to be parked or stopped due to the photographed object being an obstacle in the area in which the photographed object is present. FIG. 5 is a diagram depicting example 2 of the first nonviable parking/stopping area. In the example depicted in FIG. 5, in a case where another vehicle 6 has parked on the road, the area in which that other vehicle 6 is present (the area indicated by the dashed line) is set as the first nonviable parking/stopping area.

The parking/stopping viability determination unit 24 determines whether or not it is possible for the automatic driving vehicle 1 to be parked or stopped at the first planned parking/stopping location, on the basis of the first planned parking/stopping location stored in advance (described later on) and the first nonviable parking/stopping area decided by the nonviable parking/stopping area deciding unit 23, on the basis of a parking/stopping viability determination program stored in a parking/stopping viability determination program storage unit 310 (described later on). The parking/stopping viability determination unit 24 determines whether or not it is possible for the automatic driving vehicle 1 to be parked or stopped at the first planned parking/stopping location, according to whether or not the first planned parking/stopping location is included in the first nonviable parking/stopping area, for example. In a case where the first planned parking/stopping location is included in the first nonviable parking/stopping area, the parking/stopping viability determination unit 24 determines that it is not possible for the automatic driving vehicle 1 to be parked or stopped at the first planned parking/stopping location. However, in a case where the first planned parking/stopping location is not included in the first nonviable parking/stopping area, it is determined that it is possible for the automatic driving vehicle 1 to be parked or stopped at the first planned parking/stopping location.

Figure 6:
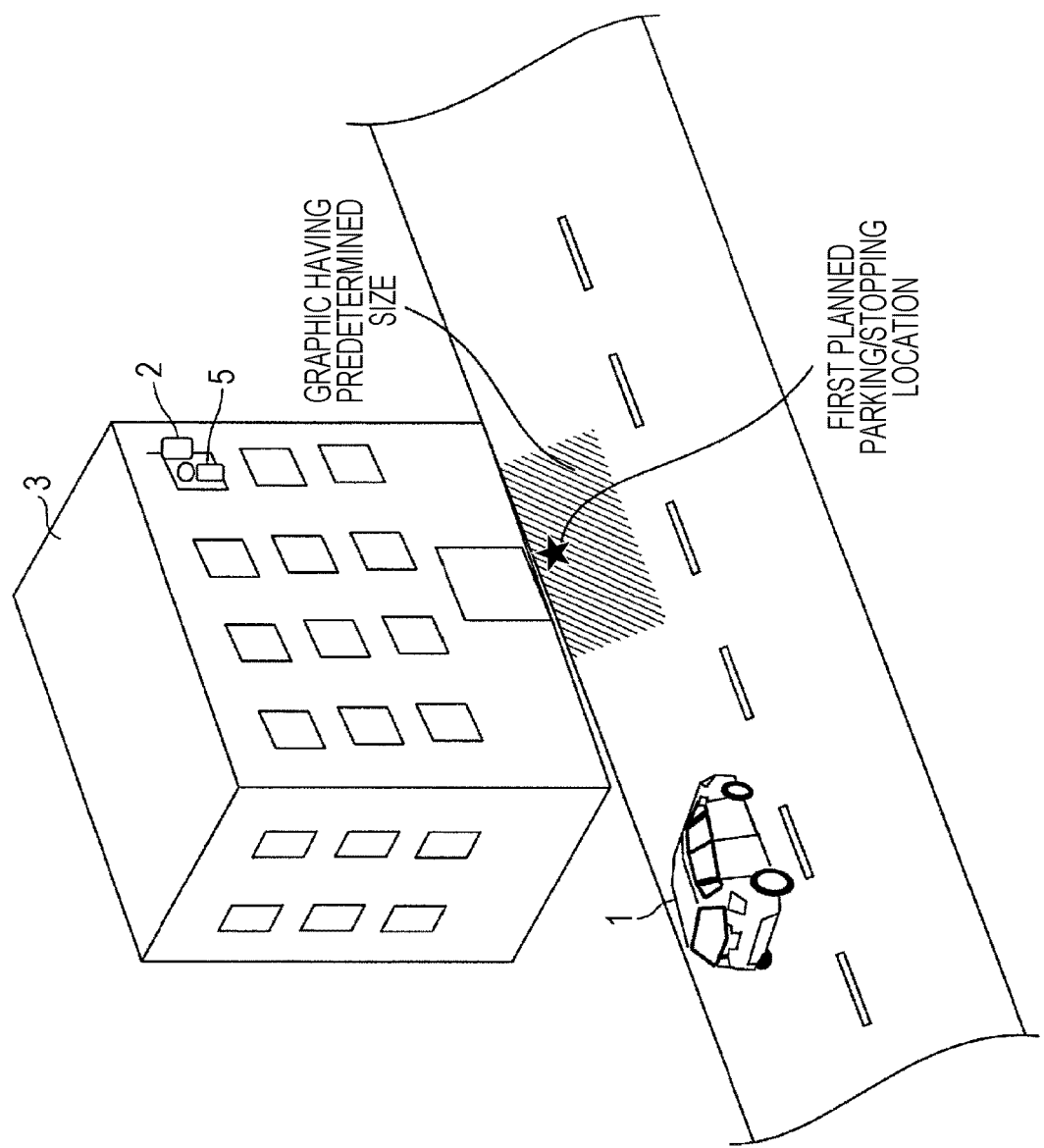
FIG. 6 is a diagram depicting an example of a first planned parking/stopping location.

FIG. 6 is a diagram depicting an example of the first planned parking/stopping location. As depicted in FIG. 6, the parking/stopping viability determination unit 24 may determine whether or not it is possible for the automatic driving vehicle 1 to be parked or stopped at the first planned parking/stopping location, according to whether or not it is possible for a graphic having a predetermined size (for example, a graphic having a size corresponding to the size of the automatic driving vehicle 1) to be arranged in such a way as to include the first planned parking/stopping location, in an area other than the first nonviable parking/stopping area. In FIG. 6, the star mark represents the first planned parking/stopping location, and the area indicated by the diagonal lines represents the graphic having the predetermined size.

In the example depicted in FIG. 6, the parking/stopping viability determination unit 24 superimposes the first nonviable parking/stopping area on map information, and then arranges the graphic having the predetermined size on the map information in such a way as to be able to move within a range that includes the first planned parking/stopping location. Thus, the parking/stopping viability determination unit 24 determines whether or not it is possible for the automatic driving vehicle 1 to be parked or stopped at the first planned parking/stopping location, according to whether or not it is possible for the graphic having the predetermined size to be arranged in an area other than the first nonviable parking/stopping area. The parking/stopping viability determination unit 24 determines that it is possible for the automatic driving vehicle 1 to be parked or stopped at the first planned parking/stopping location in a case where it is possible for the graphic having the predetermined size to be arranged. However, the parking/stopping viability determination unit 24 determines that it is not possible for the automatic driving vehicle 1 to be parked or stopped at the first planned parking/stopping location in a case where it is not possible for the graphic having the predetermined size to be arranged.

By adopting this configuration, it can be determined whether or not it is possible for the automatic driving vehicle 1 to be parked or stopped at the first planned parking/stopping location, with consideration being given to the size of the automatic driving vehicle 1. For example, it can be determined that it is not possible for the automatic driving vehicle 1 to be parked or stopped at the first planned parking/stopping location in a case where the first planned parking/stopping location is available but another vehicle has parked or stopped in front or behind the first planned parking/stopping location. It should be noted that a configuration is preferable in which, in a case where the aforementioned graphic having the predetermined size is to be arranged, it is possible for the graphic to be arranged only in a predetermined direction. The reason therefor is because, in a case where the automatic driving vehicle 1 is to park or stop on a road, it is necessary for parking or stopping to be carried out in such a way that the front-rear direction of the automatic driving vehicle 1 is parallel with the traveling direction of the road.

In a case where it is determined by the parking/stopping viability determination unit 24 that it is not possible for the automatic driving vehicle 1 to be parked or stopped at the first planned parking/stopping location, the planned parking/stopping location changing unit 25 changes the planned location where the automatic driving vehicle 1 is to park or stop, from the first planned parking/stopping location to a second planned parking/stopping location, on the basis of a planned parking/stopping location changing program stored in a planned parking/stopping location changing program storage unit 311 (described later on). In the present embodiment, a method of changing the planned location where the automatic driving vehicle 1 is to park or stop, within a range designated as the delivery destination, will be described.

First, the range designated as the delivery destination will be described. When the recipient 5 makes an order to a delivery company for the delivery of a package, in most cases, the address of the recipient 5 is designated as the delivery destination. Addresses are configured based on a residence indication scheme; however, a place designated according to a residence indication scheme is represented by an area rather than a point. Therefore, an area that is a place designated according to a residence indication scheme may be considered to be a range designated as a delivery destination.

Residence indication schemes are broadly divided into the city block system and the road system. Hereinafter, the schemes for the city block system and the road system and also a location designated as a delivery destination will be described.

Figure 7:
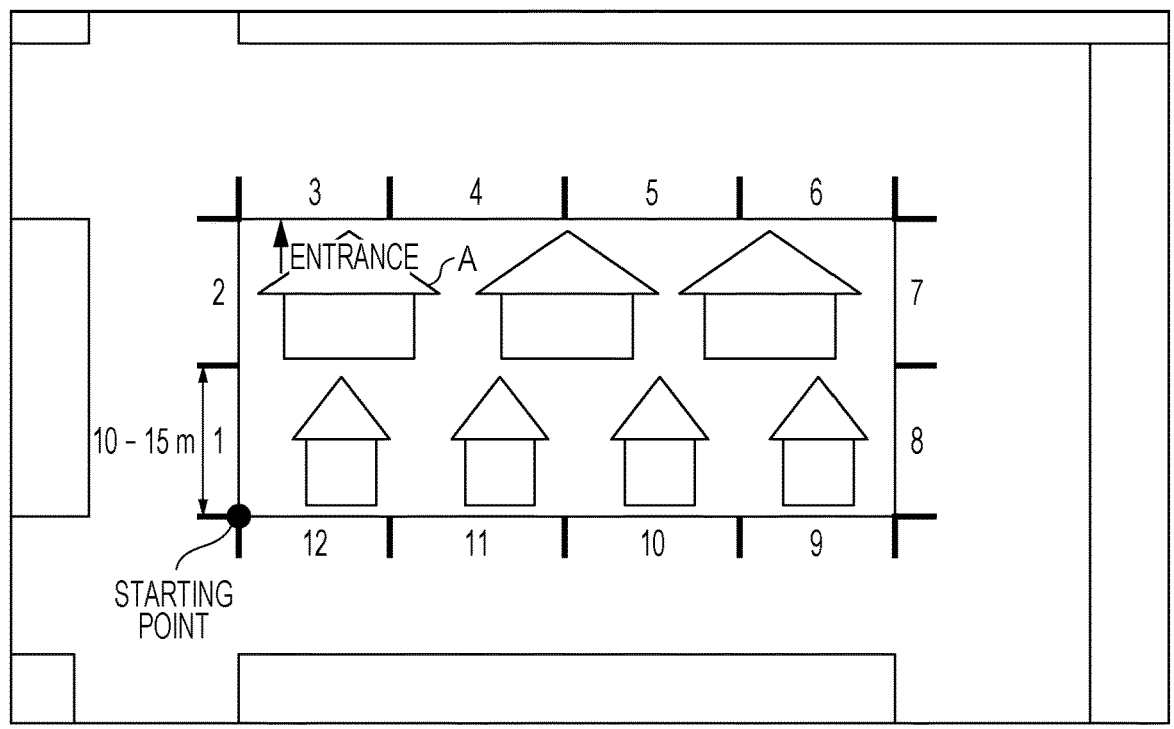
FIG. 7 is a diagram depicting an example of residence indications according to the city block method.

First, the scheme of the city block system that is often adopted in Japan will be described with reference to FIG. 7. FIG. 7 is a diagram depicting an example of residence indications according to the city block method. In the city block system, in principle, divisions (blocks) surrounded by roads are taken as units (city blocks), and one town name is configured of one or more city blocks. Codes that are referred to as city block codes are assigned in the city block system. As depicted in FIG. 7, these city block codes are basic numbers for which the periphery of a city block is divided every 10 to 15 m, with the corner near the center of the municipality serving as the starting point and the distance being measured in the clockwise direction along the outer periphery of the city block from the starting point, and "1", "2", "3", . . . "12" being sequentially assigned to the divisions. For example, in a case of a residence indication such as " . . . district A, block B, building C", the B portion is a number indicating the city block, and the C portion is a number indicating the basic number.

The residence indication according to this city block method is represented by a basic number for a location facing the entrance of a building or the main doorway of a building that is the residence indication subject. In the example depicted in FIG. 7, the residence indication for a building A is "3", which is the basic number at the location facing the entrance of the building A. Therefore, in a case where the address of the building A is designated as the delivery destination, the location designated as the delivery destination is the entire area for the basic number "3" indicated by the residence indication of the building A.

Figure 8:
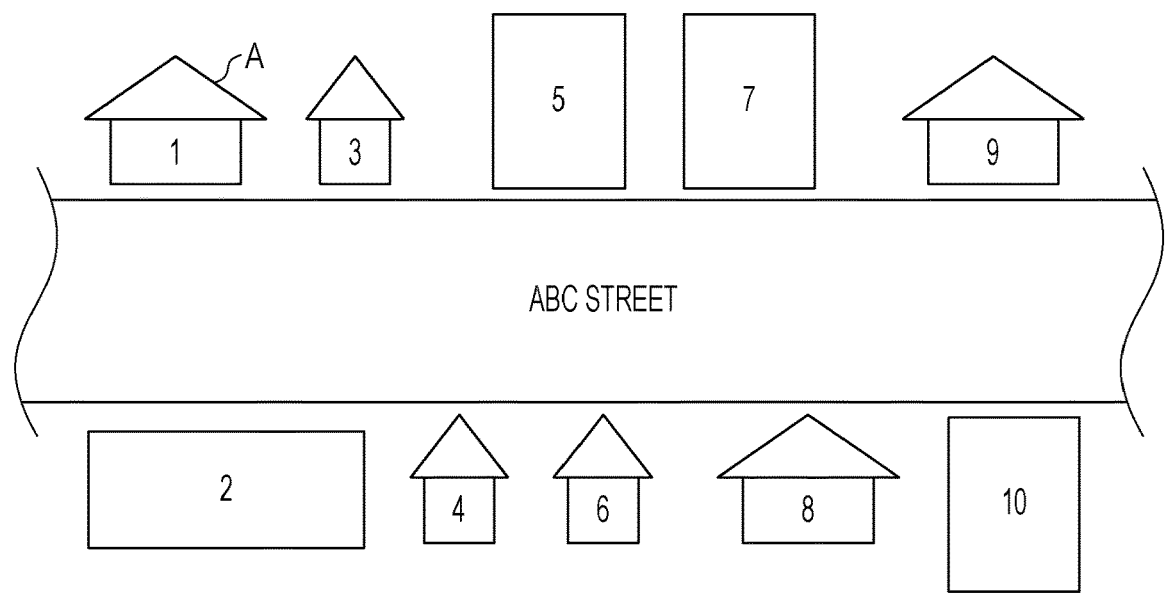
FIG. 8 is a diagram depicting an example of residence indications according to the road system.

Next, the scheme of the road system that is often adopted outside of Japan will be described with reference to FIG. 8. FIG. 8 is a diagram depicting an example of residence indications according to the road system. As depicted in FIG. 8, in the road system, the name "ABC Street" is assigned to a road and residence numbers "1", "2", "3", . . . "10" are assigned to buildings facing the road in question or having a road that leads to the road in question. A residence indication according to the road system is represented by the name of the road and a residence number assigned to a building. In the example depicted in FIG. 8, residence numbers that are odd numbers are assigned to the buildings on one side of the road "ABC Street", and residence numbers that are even numbers are assigned to the other side. In the example depicted in FIG. 8, the residence indication of the building A is "1", which is the residence number of the building A, and the range thereof is the area of the section where the building A faces the road. Therefore, in a case where the address of the building A is designated as the delivery destination, the location designated as the delivery destination is the area of the section where the building A indicated by the residence indication faces the road. It should be noted that, although the way in which residence numbers are assigned is different depending on the country or region, the scheme for indicating a residence using the names of roads and residence numbers assigned to buildings is the same.

Figure 9:
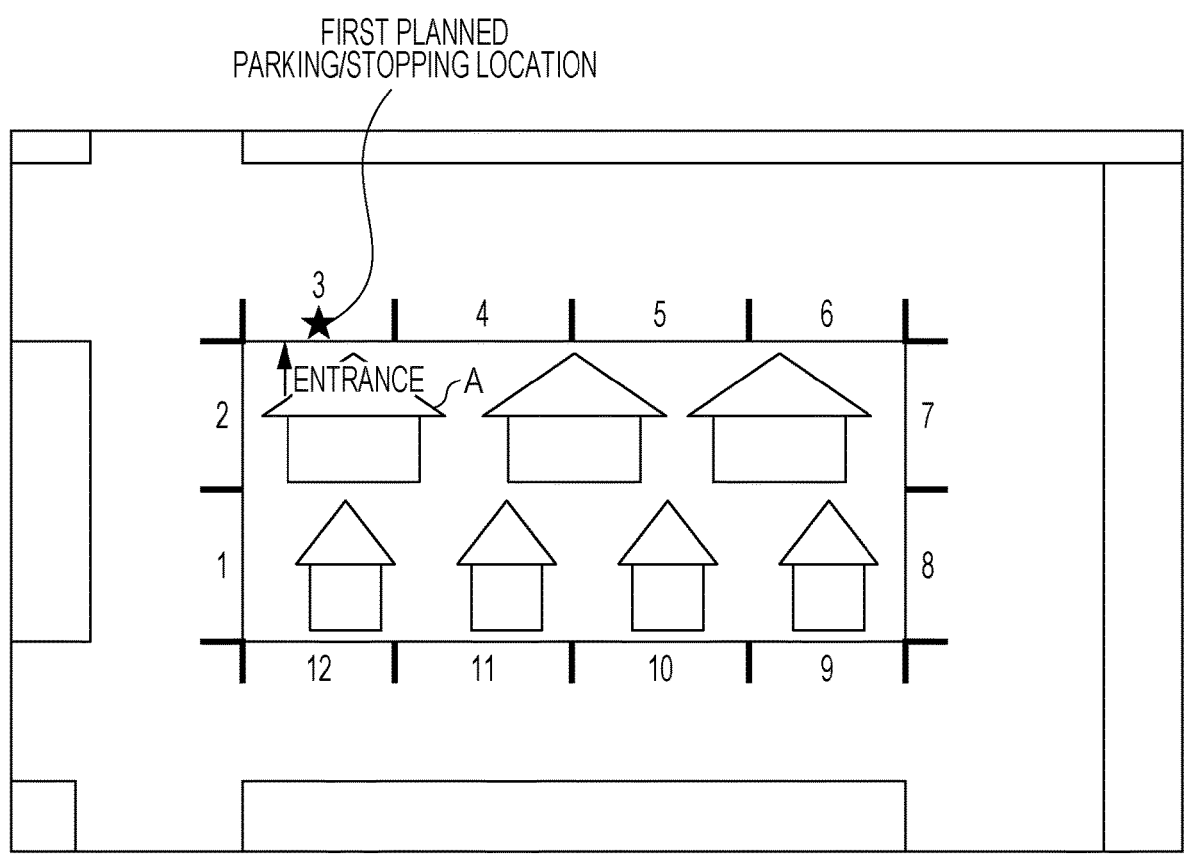
FIG. 9 is a diagram depicting an example of the first planned parking/stopping location in the example of FIG. 7.

As mentioned above, an address designated as the delivery destination indicates an area, and therefore, in a case where a package is to be delivered by the automatic driving vehicle 1, an arbitrary point is selected as the first planned parking/stopping location within the area indicated by the address. As a method of selecting the first planned parking/stopping location, the selection may be carried out by the user, or a configuration may be adopted in which the selection is carried out automatically by a dedicated program. FIG. 9 is a diagram depicting an example of the first planned parking/stopping location in the example of FIG. 7. In the example depicted in FIG. 9, the center of an area designated as the delivery destination is selected as the first planned parking/stopping location. It should be noted that, as another example, in a case where the location of an entrance of a building is known in advance, a configuration may be adopted in which the closest place from the entrance of the building is decided as the first planned parking/stopping location.

Figure 10:
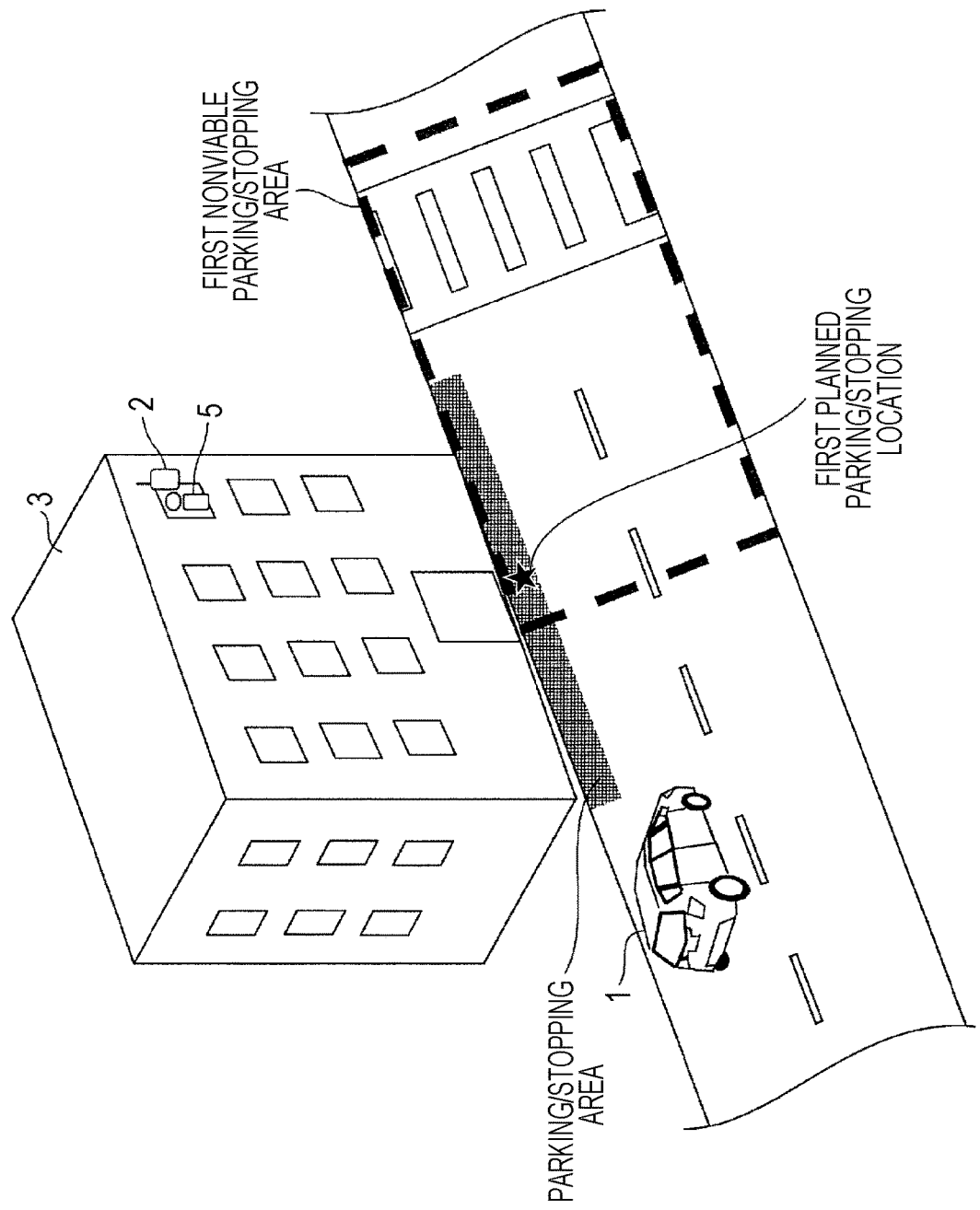
FIG. 10 is a diagram depicting an example of a method of changing the planned parking/stopping location of the automatic driving vehicle.
Figure 11:
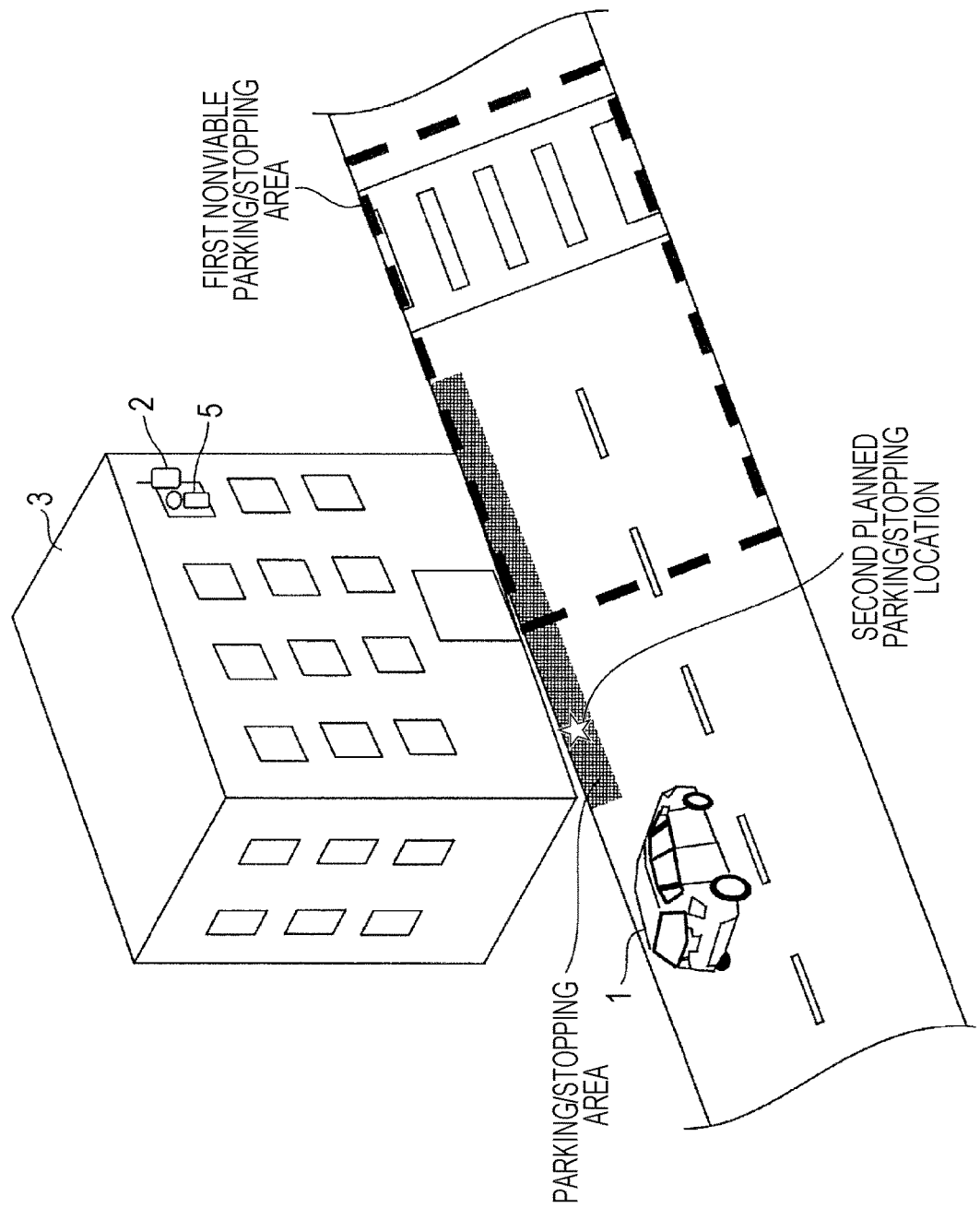
FIG. 11 is a diagram depicting an example of a method of changing the planned parking/stopping location of the automatic driving vehicle.

Here, a method of changing the planned parking/stopping location for the automatic driving vehicle 1 by means of the planned parking/stopping location changing unit 25 will be described with reference to FIGS. 10 and 11. FIGS. 10 and 11 are diagrams depicting an example of a method of changing the planned parking/stopping location of the automatic driving vehicle 1. In the example depicted in FIG. 10, the first planned parking/stopping location (the location indicated by the star mark) is included in the first nonviable parking/stopping area (the area indicated by the dashed line), and therefore the parking/stopping viability determination unit 24 determines that it is not possible for the automatic driving vehicle 1 to be parked or stopped at the first planned parking/stopping location. In this case, the planned parking/stopping location changing unit 25, first, on the basis of the area designated as the delivery destination (hereinafter, referred to as a "parking/stopping area") and the first nonviable parking/stopping area decided by the nonviable parking/stopping area deciding unit 23, decides an area (hereinafter, referred to as a "viable parking/stopping area") that is not included in the first nonviable parking/stopping area, within the parking/stopping area. Then, as depicted in FIG. 11, the planned parking/stopping location changing unit 25 decides, as a second planned parking/stopping location (the location indicated by the star mark), a location at which, in a case where the automatic driving vehicle 1 is parked or stopped, the area of the parked or stopped automatic driving vehicle 1 does not overlap with the first nonviable parking/stopping area, and at which at least a portion of the area of the automatic driving vehicle 1 is included in the viable parking/stopping area. According to this configuration, it is possible for the automatic driving vehicle 1 to not be parked or stopped in the first nonviable parking/stopping area, and it is possible for the automatic driving vehicle 1 to be parked or stopped at a location indicated by the designated delivery destination.

The notification control unit 26 generates notification information for notifying the recipient 5, on the basis of a notification control program stored in a notification control program storage unit 312 (described later on), and transmits the generated notification information to the recipient terminal 2. It should be noted that the notification control unit 26 transmits the notification information to the recipient terminal 2 on the basis of a terminal address of the recipient terminal 2 stored in advance in a recipient terminal information storage unit 307 (described later on).

For example, in a case where it is determined by the parking/stopping viability determination unit 24 that it is possible for the automatic driving vehicle 1 to be parked or stopped, the notification control unit 26 transmits notification information to the recipient terminal 2 indicating that the automatic driving vehicle 1 has parked or stopped at the delivery destination. Furthermore, for example, in a case where it is determined by the parking/stopping viability determination unit 24 that it is not possible for the planned parking/stopping location of the automatic driving vehicle 1 to be changed within the parking/stopping area, the notification control unit 26 transmits notification information to the recipient terminal 2 indicating that it is not possible for the automatic driving vehicle 1 to be parked or stopped at the delivery destination.

The storage unit 17 is configured of a semiconductor memory, for example. The storage unit 17 is provided with a map information storage unit 301, the automatic driving basic program storage unit 302, the route information storage unit 303, a vehicle location information storage unit 304, a planned parking/stopping location information storage unit 305, a parking/stopping area storage unit 306, the recipient terminal information storage unit 307, the photographed object identification program storage unit 308, the nonviable parking/stopping area deciding program storage unit 309, the parking/stopping viability determination program storage unit 310, the planned parking/stopping location changing program storage unit 311, and the notification control program storage unit 312.

The map information storage unit 301 stores map information. The map information includes, for example, (a) road data relating to road links, (b) intersection point data relating to intersection points, (c) facility data relating to facilities, (d) feature data indicating display objects installed or formed on roads to provide information, guidance, and the like on various types of travel to drivers, or the like. This map information, for example, is acquired in advance from an external server or the like and stored. It should be noted that a configuration is preferable in which the external server or the like is periodically accessed for the map information to be updated to the most up-to-date version.

The automatic driving basic program storage unit 302 stores an automatic driving basic program for controlling the movement of the automatic driving vehicle 1. In accordance with the aforementioned automatic driving basic program, the movement control unit 21 controls the movement of the automatic driving vehicle 1 by controlling the drive unit 15 on the basis of sensing information measured by the sensor unit 14 and information regarding the vehicle location acquired by the location measurement unit 13.

The route information storage unit 303 stores information indicating a route from a place of departure to a planned parking/stopping location constituting the delivery destination. The automatic driving vehicle 1, for example, is able to acquire information indicating a route that has been set by an existing route setting program of the external server or the like, by receiving this information from the external server or the like. Alternatively, information indicating a route may be set by a route generation program of the automatic driving vehicle 1.

The vehicle location information storage unit 304 stores information indicating the vehicle location acquired by the location measurement unit 13. The movement control unit 21 is able to decide the movement direction of the automatic driving vehicle 1 on the basis of a location indicating the vehicle stored in the vehicle location information storage unit 304 and information indicating a route stored in the route information storage unit 303.

The planned parking/stopping location information storage unit 305 stores information regarding the first planned parking/stopping location indicating a planned location where the automatic driving vehicle 1 is to park or stop. The first planned parking/stopping location is decided in advance on the basis of a delivery destination that has been input by means of the recipient terminal 2 during online shopping, for example. Furthermore, in a case where the planned parking/stopping location of the automatic driving vehicle 1 has been changed by the planned parking/stopping location changing unit 25, the information regarding the first planned parking/stopping location stored in the planned parking/stopping location information storage unit 305 is also changed. It should be noted that the information regarding the first planned parking/stopping location is, for example, information in which the first planned parking/stopping location is superimposed on the map information.

The parking/stopping area storage unit 306 stores information indicating an area represented by information regarding the delivery destination. In a case where the delivery destination is an address, the location represented by the information regarding the delivery destination indicates an area, and therefore information indicating that area is stored.

The recipient terminal information storage unit 307 stores information indicating a terminal address of the recipient terminal 2, for example. The terminal address of the recipient terminal 2 is used when the automatic driving vehicle 1 transmits notification information to the recipient terminal 2, for example. When a delivery is ordered during online shopping, for example, information regarding a terminal address that is input by the recipient terminal 2 is stored in the recipient terminal information storage unit 307.

The photographed object identification program storage unit 308 stores a photographed object identification program for identifying a photographed object that has been photographed by the imaging units 12. The photographed object identification program is executed by the photographed object identification unit 22. Information regarding image templates for identifying photographed objects are included in advance in the photographed object identification program.

The nonviable parking/stopping area deciding program storage unit 309 stores a nonviable parking/stopping area deciding program for deciding the first nonviable parking/stopping area on the basis of the photographed object identified by the photographed object identification unit 22. The nonviable parking/stopping area deciding program is executed by the nonviable parking/stopping area deciding unit 23. Nonviable parking/stopping area setting rules that have been determined for each photographed object are included in advance in the nonviable parking/stopping area deciding program.

The parking/stopping viability determination program storage unit 310 stores a parking/stopping viability determination program for determining whether or not it is possible for the automatic driving vehicle 1 to park or stop at the first planned parking/stopping location. The parking/stopping viability determination program is executed by the parking/stopping viability determination unit 24.

The planned parking/stopping location changing program storage unit 311 stores a planned parking/stopping location changing program for changing the planned parking/stopping location of the automatic driving vehicle 1 in a case where it has been determined by the parking/stopping viability determination unit 24 that it is not possible for the automatic driving vehicle 1 to park or stop. The planned parking/stopping location changing program is executed by the planned parking/stopping location changing unit 25.

The notification control program storage unit 312 stores a notification control program for generating notification information from the automatic driving vehicle 1 to the recipient terminal 2, and transmitting the notification information to the recipient terminal 2. The notification control program is executed by the notification control unit 26.

1-3. Functional Configuration of Recipient Terminal

Figure 12:
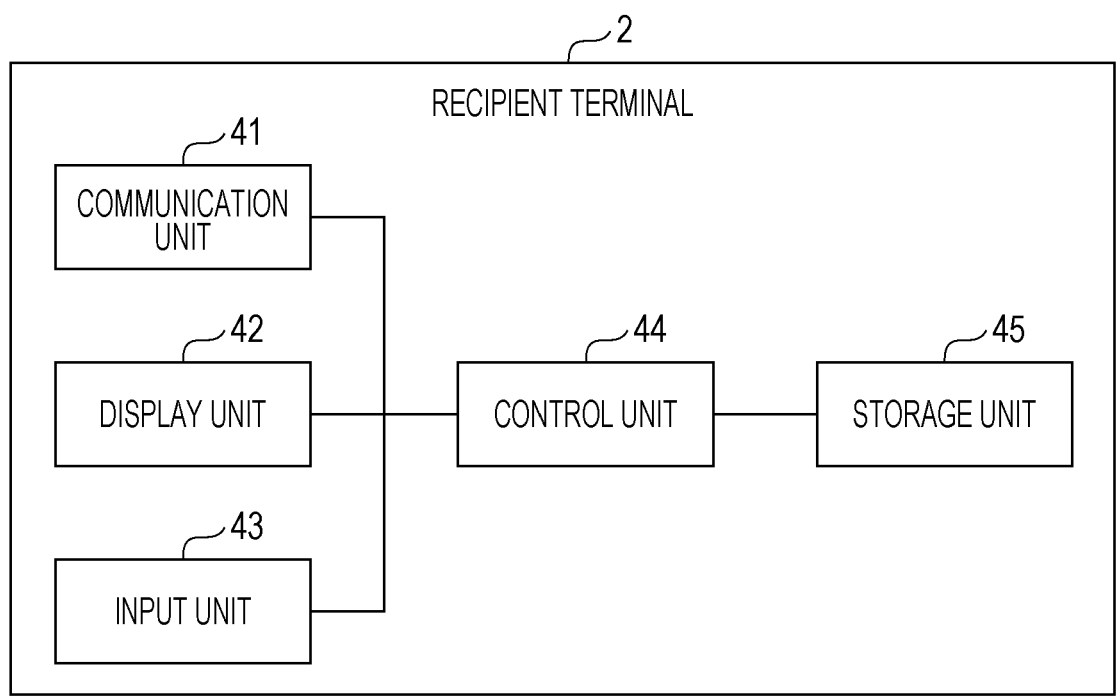
FIG. 12 is a block diagram depicting a functional configuration of a recipient terminal according to embodiment 1.

Next, a functional configuration of the recipient terminal 2 will be described with reference to FIG. 12. FIG. 12 is a block diagram depicting a functional configuration of the recipient terminal 2 according to embodiment 1.

As depicted in FIG. 12, the recipient terminal 2 is provided with the communication unit 41, a display unit 42, an input unit 43, a control unit 44, and a storage unit 45.

The communication unit 41 transmits various information to the communication unit 11 of the automatic driving vehicle 1, and receives various information from the communication unit 11 of the automatic driving vehicle 1.

The display unit 42 is, for example, a liquid crystal display or the like, and displays notification information or the like received from the automatic driving vehicle 1.

The input unit 43 is, for example, a keyboard and mouse or the like. The recipient 5 is able to input, for example, information regarding the delivery destination or the like by using the input unit 43. It should be noted that the input unit 43 may have a configuration that is integrated with a display unit, such as a touch panel of a smartphone, for example.

The control unit 44 is, for example, a CPU, and carries out various forms of control for the recipient terminal 2.

The storage unit 45 is, for example, a semiconductor memory or the like, and stores information received from the automatic driving vehicle 1, information that has been input by means of the input unit 43, or the like.

1-4. Operation of Automatic Driving Vehicle

Figure 13:
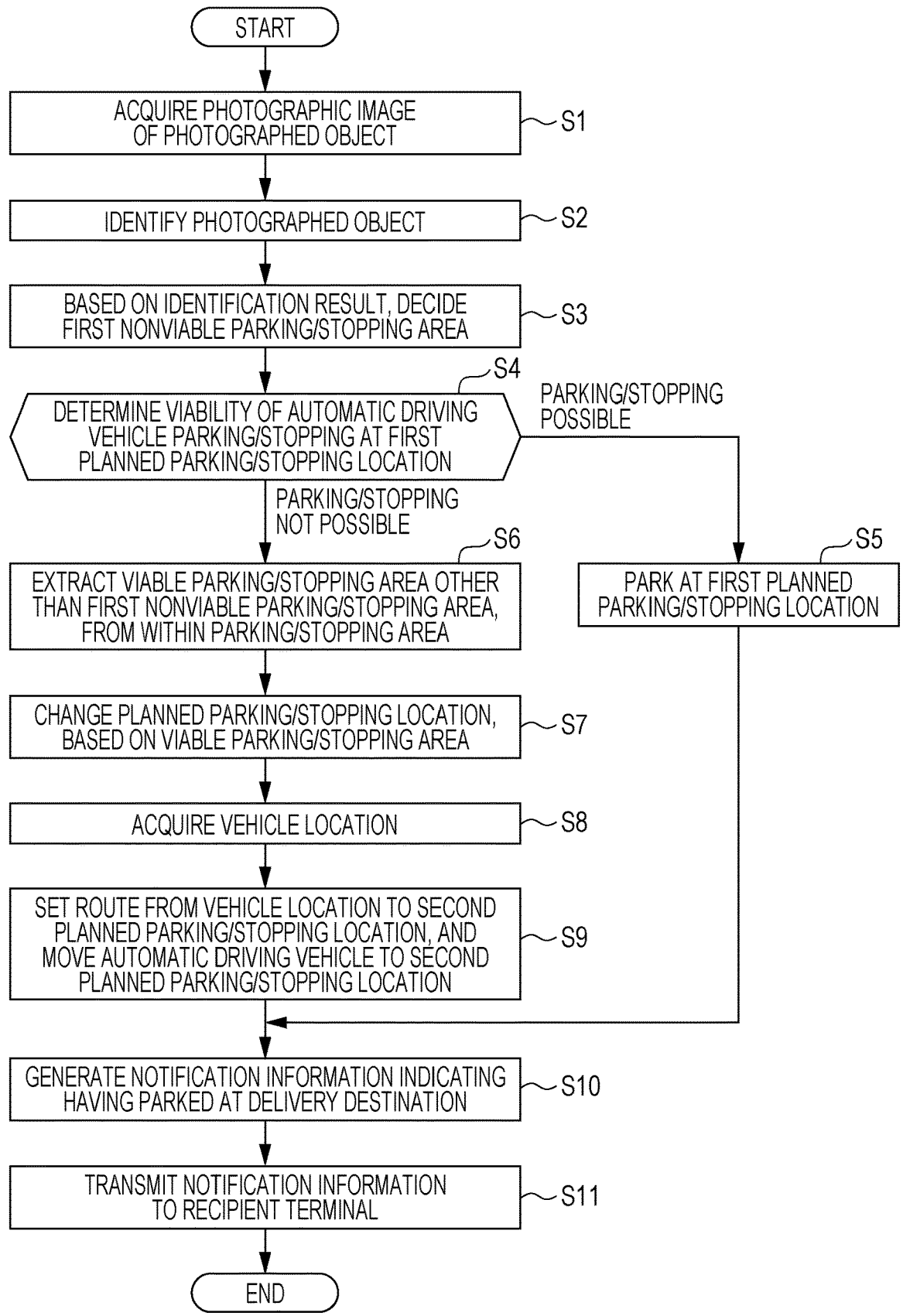
FIG. 13 is a flowchart depicting the flow of an operation of the automatic driving vehicle according to embodiment 1.

Next, an operation of the automatic driving vehicle 1 will be described with reference to FIG. 13. FIG. 13 is a flowchart depicting the flow of an operation of the automatic driving vehicle 1 according to embodiment 1.

As depicted in FIG. 13, first, the photographed object identification unit 22 acquires a photographic image of a photographed object from the imaging units 12 (S1), and identifies the photographed object on the basis of the photographic image acquired (S2).

Next, the nonviable parking/stopping area deciding unit 23 decides the first nonviable parking/stopping area on the basis of the photographed object identified by the photographed object identification unit 22 (S3).

Next, the parking/stopping viability determination unit 24 determines whether or not it is possible for the automatic driving vehicle 1 to park or stop at the first planned parking/stopping location, on the basis of the first planned parking/stopping location stored in advance and the first nonviable parking/stopping area decided by the nonviable parking/stopping area deciding unit 23 (S4).

In step S4, in a case where it has been determined by the parking/stopping viability determination unit 24 that it is possible for the automatic driving vehicle 1 to park or stop at the first planned parking/stopping location, the movement control unit 21 causes the automatic driving vehicle 1 to move to the first planned parking/stopping location, and causes the automatic driving vehicle 1 to park at the first planned parking/stopping location (S5).

However, in step S4, in a case where it has been determined by the parking/stopping viability determination unit 24 that it is not possible for the automatic driving vehicle 1 to park or stop at the first planned parking/stopping location, the planned parking/stopping location changing unit 25 changes the planned parking/stopping location of the automatic driving vehicle 1.

The planned parking/stopping location changing unit 25, first, extracts an area (a viable parking/stopping area) other than the first nonviable parking/stopping area, within a parking/stopping area, on the basis of the parking/stopping area stored in the parking/stopping area storage unit 306 and the first nonviable parking/stopping area decided by the nonviable parking/stopping area deciding unit 23 in step S3 (S6). Thereafter, the planned parking/stopping location changing unit 25 decides, as a second planned parking/stopping location, a location at which, in a case where the automatic driving vehicle 1 is parked or stopped, the area of the parked or stopped automatic driving vehicle 1 does not overlap with the first nonviable parking/stopping area, and at which at least a portion of the automatic driving vehicle 1 is included in the viable parking/stopping area. Thus, the planned parking/stopping location changing unit 25 changes the planned parking/stopping location of the automatic driving vehicle 1 from the first planned parking/stopping location to the second planned parking/stopping location (S7).

Next, the movement control unit 21 acquires information regarding the vehicle location from the location measurement unit 13 (S8). This processing, for example, is carried out by receiving, from the location measurement unit 13, information regarding the vehicle location measured by the location measurement unit 13, when the movement control unit 21 has instructed the location measurement unit 13. Alternatively, in a case where the location measurement unit 13 periodically measures information regarding the vehicle location, the movement control unit 21 may acquire information regarding the vehicle location that was last measured, from the vehicle location information storage unit 304. However, in this case, there is a possibility that, as the elapsed time from the time at which the information regarding the vehicle location was last measured increases, the difference between the vehicle location at the point in time at which the measurement was carried out and the present vehicle location may increase. Therefore, it is preferable that the movement control unit 21 acquire information regarding the vehicle location that was last measured, from the vehicle location information storage unit 304, only in a case where the time at which the information regarding the vehicle location was last measured is within a predetermined period from the present time.

Thereafter, the movement control unit 21 sets a route from the vehicle location to the second planned parking/stopping location on the basis of the information regarding the vehicle location acquired in step S8, and, on the basis of the set route, causes the automatic driving vehicle 1 to move from the vehicle location to the second planned parking/stopping location, and causes the automatic driving vehicle 1 to park at the second planned parking/stopping location (S9).

Figure 14:
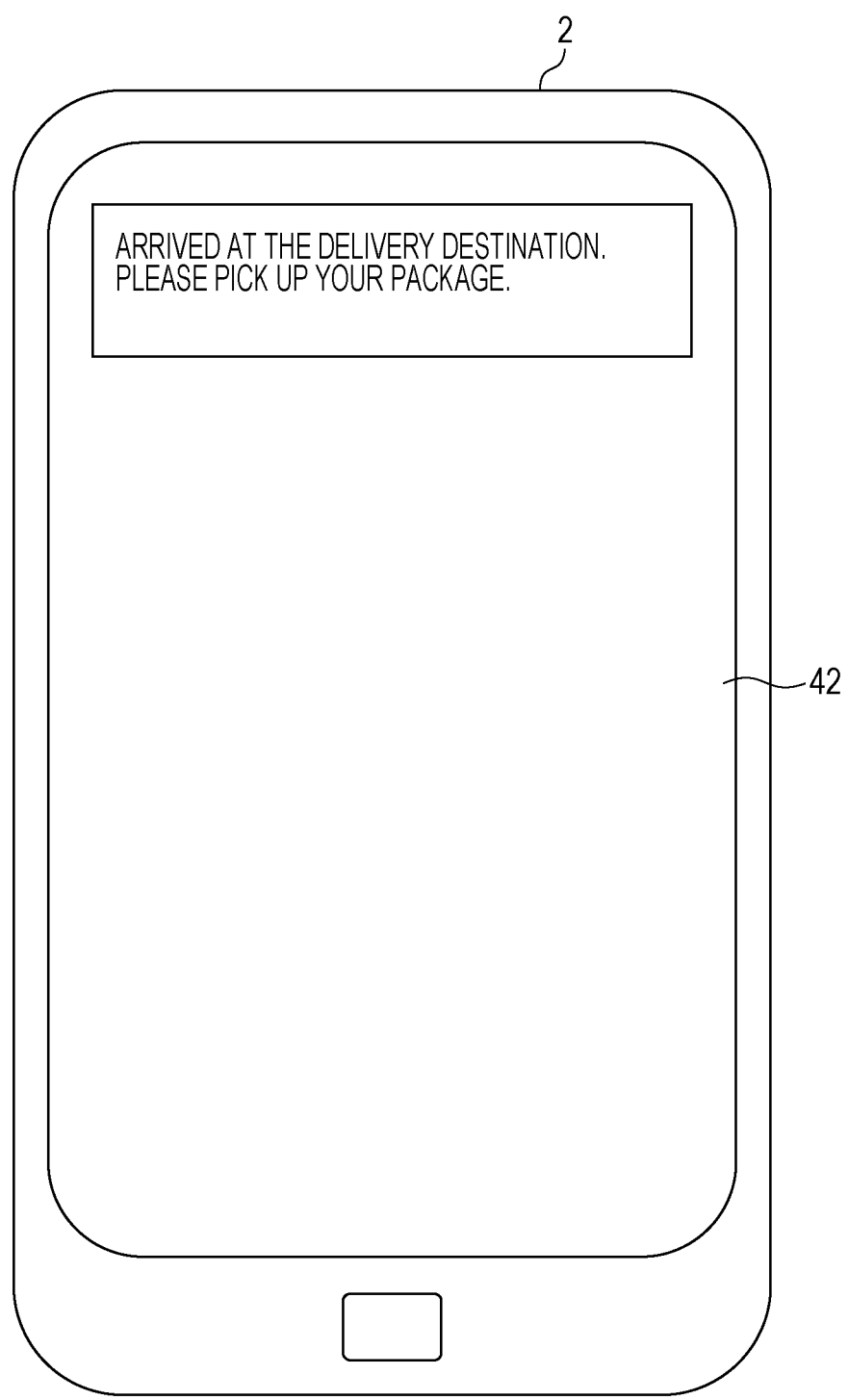
FIG. 14 is a diagram depicting display example 1 of notification information in the recipient terminal according to embodiment 1.

Thereafter, the notification control unit 26 generates notification information indicating that the automatic driving vehicle 1 has been parked at the delivery destination (S10), and transmits the generated information to the recipient terminal 2 on the basis of the terminal address of the recipient terminal 2 stored in the recipient terminal information storage unit 307 (S11). FIG. 14 is a diagram depicting display example 1 of notification information in the recipient terminal 2 according to embodiment 1. In the example depicted in 14, the message "Arrived at the delivery destination. Please pick up your package." is displayed on the display unit 42 of the recipient terminal 2 as notification information indicating that the automatic driving vehicle 1 has arrived at the delivery destination.

1-5. Effects

According to the above configuration, in a case where it is determined that it is not possible for the automatic driving vehicle 1 to be parked or stopped at the first planned parking/stopping location, the planned location where the automatic driving vehicle 1 is to parked or stopped is changed from the first planned parking/stopping location to the second planned parking/stopping location. The automatic driving vehicle 1 can thereby be parked or stopped without violating the Road Traffic Act, for example.

1-6. Modified Example

Figure 15:
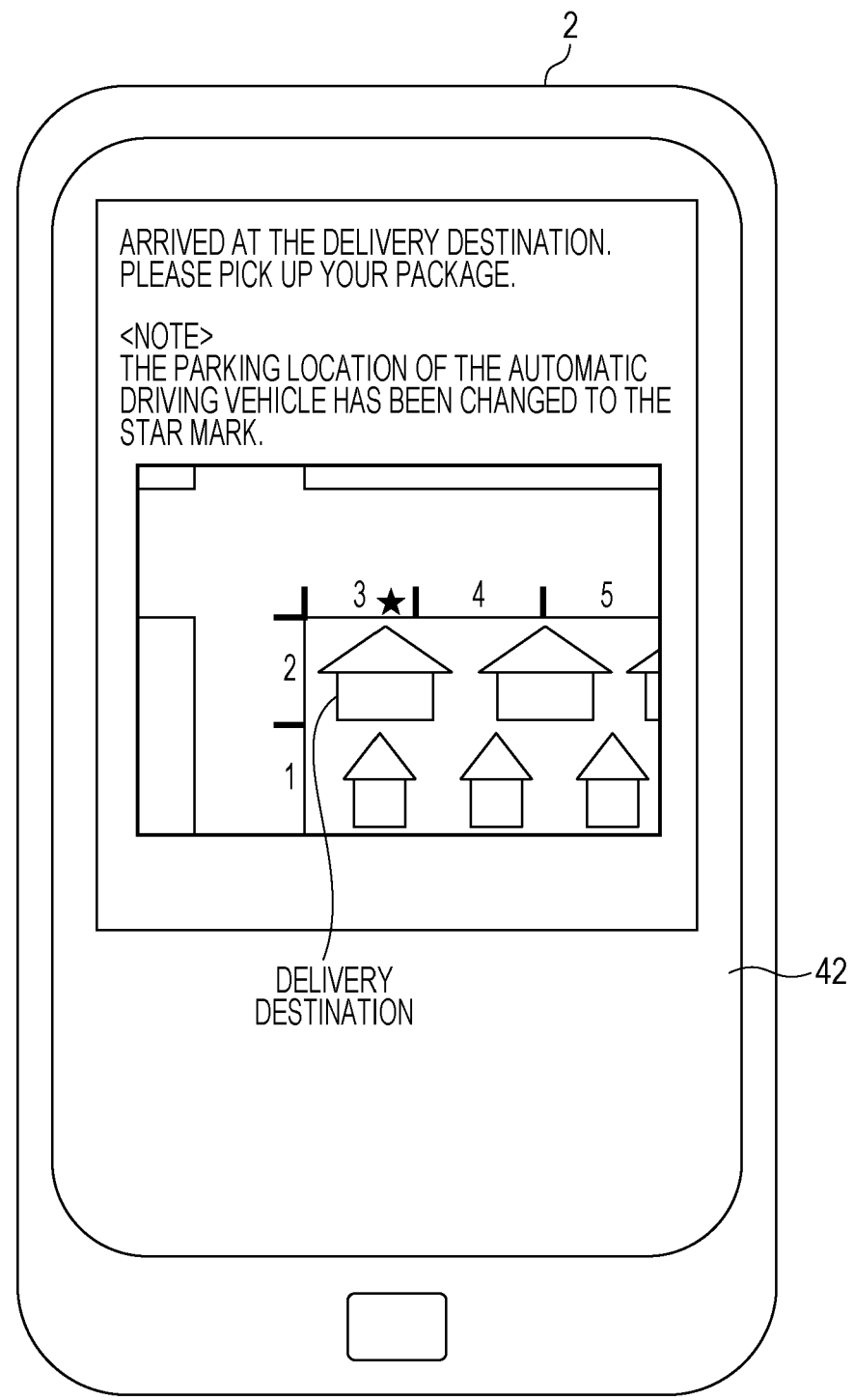
FIG. 15 is a diagram depicting display example 2 of notification information in the recipient terminal according to embodiment 1.

Embodiment 1 had a configuration in which, in step S10, the notification control unit 26 transmits, to the recipient terminal 2, notification information indicating that the automatic driving vehicle 1 has parked at the delivery destination; however, a configuration may be adopted in which, in a case where the planned parking/stopping location of the automatic driving vehicle 1 has been changed within the parking/stopping area by the planned parking/stopping location changing unit 25, in addition, notification information indicating the planned parking/stopping location that has been changed (the second planned parking/stopping location) (an example of third notification information) is transmitted to the recipient terminal 2. FIG. 15 is a diagram depicting display example 2 of notification information in the recipient terminal 2 according to embodiment 1. In the example depicted in FIG. 15, map information in which the second planned parking/stopping location is depicted by a star mark is displayed as notification information indicating the second planned parking/stopping location, on the display unit 42 of the recipient terminal 2. By adopting this configuration, for example, in a case where the first planned parking/stopping location has been notified to the recipient terminal 2 in advance, the recipient terminal 2 can be notified that parking or stopping has been carried out in a place that is different from the notified first planned parking/stopping location, and therefore the recipient can go to the parked or stopped automatic driving vehicle 1 to get the package without any problems.

Furthermore, embodiment 1 had a configuration in which, in a case where the planned parking/stopping location of the automatic driving vehicle 1 has been changed within the parking/stopping area by the planned parking/stopping location changing unit 25, notification information indicating that the automatic driving vehicle 1 has arrived at the delivery destination is transmitted to the recipient terminal 2; however, a configuration may be adopted in which notification information indicating that the planned parking/stopping location has been changed (an example of first notification information) is transmitted to the recipient terminal 2. By adopting this configuration, for example, in a case where the planned parking/stopping location has been notified to the recipient terminal 2 in advance, the recipient is able to know that the notified planned parking/stopping location has been changed.

At such time, in a case where the second planned parking/stopping location is included within the parking/stopping area, the notification control unit 26 may not transmit, to the recipient terminal 2, notification information indicating that the planned parking/stopping location has been changed. This is because, in a case where it is possible to carry out a delivery that corresponds to the wishes of the recipient 5, it is not necessary to notify the recipient 5 that the planned parking/stopping location of the automatic driving vehicle 1 is to be changed.

Furthermore, embodiment 1 had a configuration in which the determination as to whether or not it is possible for the automatic driving vehicle 1 to park or stop is carried out by the parking/stopping viability determination unit 24; however, a configuration may be adopted in which the determination as to whether or not it is possible for the automatic driving vehicle 1 to park is carried out by the control unit 16 being further provided with a nonviable parking area deciding unit 31 and a parking viability determination unit 32 (see FIG. 2).

Figure 16:
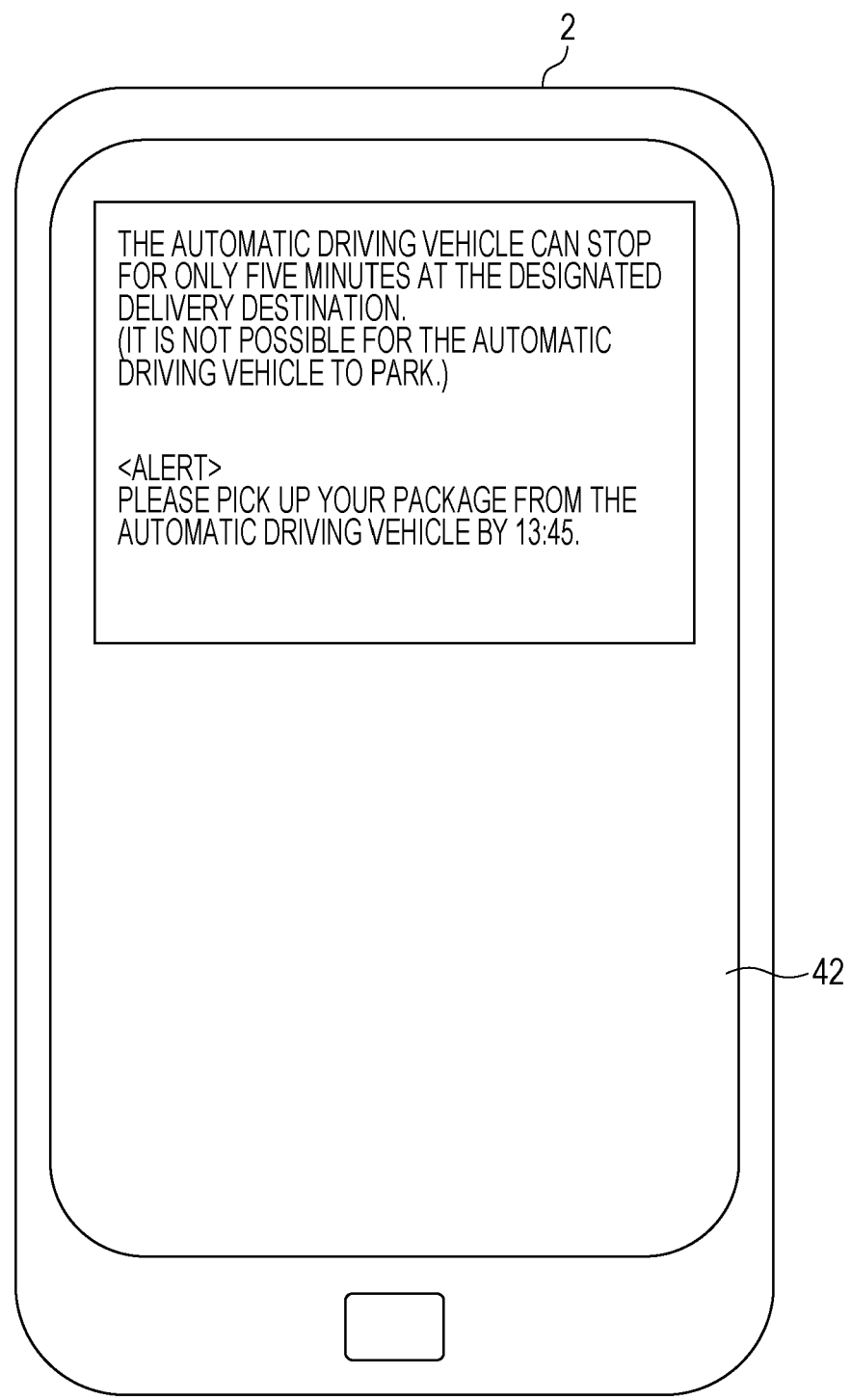
FIG. 16 is a diagram depicting display example 3 of notification information in the recipient terminal according to embodiment 1.

Specifically, in step S4, in a case where it has been determined by the parking/stopping viability determination unit 24 that it is possible for the automatic driving vehicle 1 to park or stop at the first planned parking/stopping location, whether or not it is possible for the automatic driving vehicle 1 to park at the first planned parking/stopping location is determined by the parking viability determination unit 32. In a case where it is determined that parking is possible, notification information indicating that the automatic driving vehicle 1 is to park at the first planned parking/stopping location is transmitted to the recipient terminal 2, and in a case where it is determined that parking is not possible, notification information indicating that it is possible for the automatic driving vehicle 1 to stop at the first planned parking/stopping location for a predetermined period only (an example of fourth notification information) is transmitted to the recipient terminal 2. FIG. 16 is a diagram depicting display example 3 of notification information in the recipient terminal 2 according to embodiment 1. In the example depicted in 16, the message "The automatic driving vehicle can stop for only five minutes at the designated delivery destination." is displayed on the display unit 42 of the recipient terminal 2 as notification information indicating that it is possible for the automatic driving vehicle 1 to stop at the first planned parking/stopping location for a predetermined period only.

By adopting this configuration, the recipient 5 is able to comprehend whether the automatic driving vehicle 1 is able to park at the first planned parking/stopping location or is able to stop for a predetermined period only. Here, the predetermined period is a period that is determined in advance, and is a period (for example, five minutes) in which stopping that is not considered to be parking specified according to the Road Traffic Act, Article 45, for example, is possible. This predetermined period may be an arbitrary period (for example, three minutes) provided it is a period that is shorter than the period in which stopping that is not considered to be parking specified by law is possible. As depicted in FIG. 16, by adopting a configuration in which information regarding this predetermined period is included in notification information, the recipient 5, in a case where it is possible for the automatic driving vehicle 1 to stop at the first planned parking/stopping location for a predetermined period only, is able to recognize that it is necessary to get the package within the predetermined period from the automatic driving vehicle 1 having arrived at the first planned parking/stopping location.

It should be noted that, in a case where this configuration is adopted, similar to the nonviable parking/stopping area deciding unit 23, the nonviable parking area deciding unit 31 stores, in advance, nonviable parking area setting rules that are determined for each photographed object, and decides a nonviable parking area from a photographed object identified by the photographed object identification unit 22, on the basis of the nonviable parking area setting rules. The nonviable parking area setting rules have a configuration that includes at least (a) a rule for setting a nonviable parking area on the basis of a law relating to the prohibition of parking, and (b) a rule for setting the area in which a photographed object is present as a nonviable parking area. The law relating to the prohibition of parking includes, for example, in the case of Japan, stipulations relating to the prohibition of parking in the Road Traffic Act, Article 45. FIG. 17 is a diagram depicting an example of nonviable parking area setting rules based on the stipulations of the Road Traffic Act, Article 45. In the example depicted in FIG. 17, in a case where the photographed object is a "fire hydrant", for a nonviable parking area setting rule, "a section within five meters from the location where a fire hydrant is installed" is set.

Figure 18:
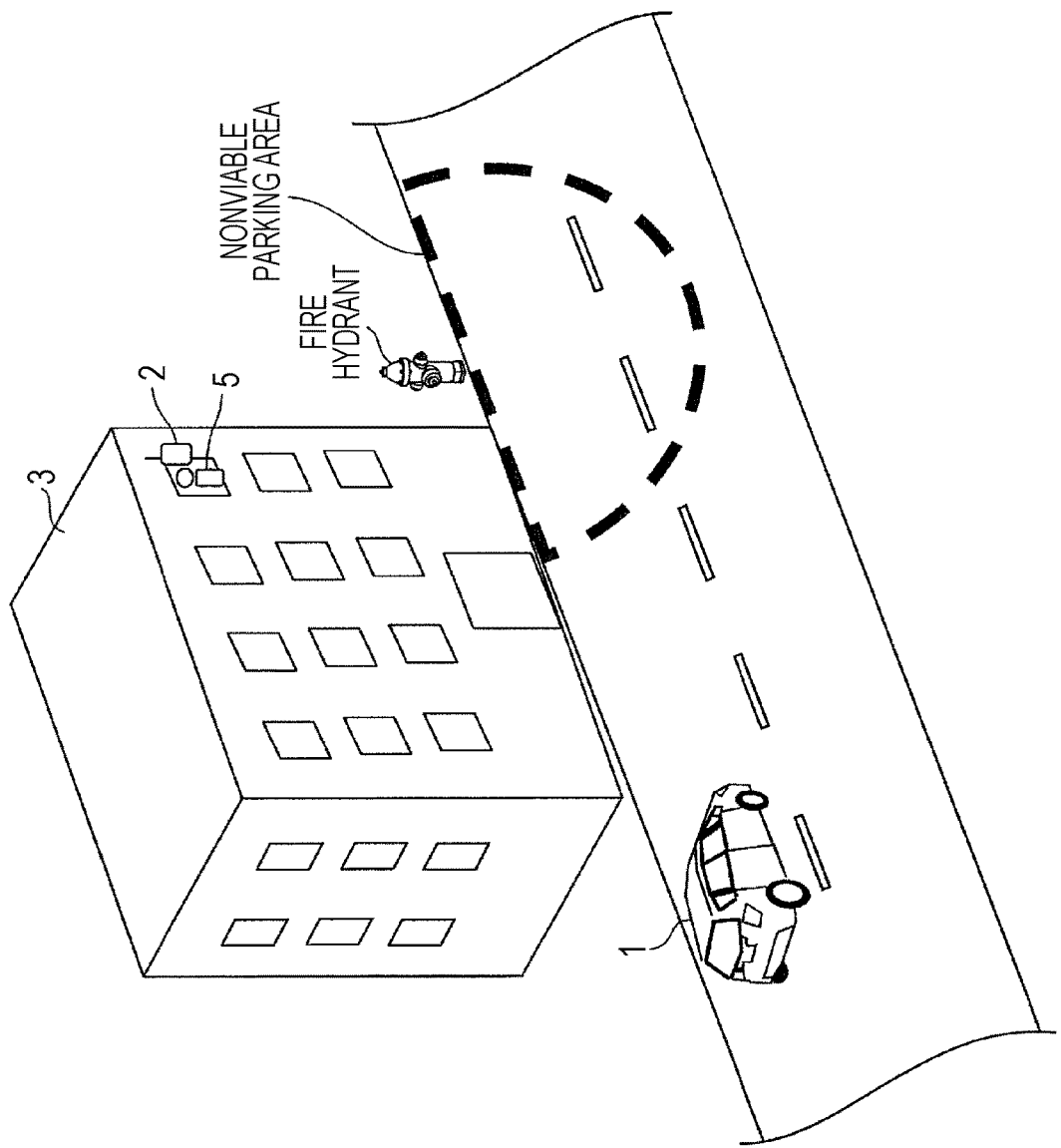
FIG. 18 is a diagram depicting an example of a nonviable parking area.

FIG. 18 is a diagram depicting an example of a nonviable parking area. In the example depicted in FIG. 18, in a case where the photographed object is a "fire hydrant", a nonviable parking area (the area indicated by the dashed line) is set on the basis of the nonviable parking area setting rules depicted in FIG. 17.

Furthermore, a configuration may be adopted in which, similar to the parking/stopping viability determination unit 24, the parking viability determination unit 32 determines whether or not it is possible for the automatic driving vehicle 1 to park at the first planned parking/stopping location, on the basis of the first planned parking/stopping location and the nonviable parking area, and in a case where it is determined that parking is not possible, the planned parking/stopping location is changed in the parking/stopping area that is the area indicated by the delivery destination. In a case where the recipient 5 is to go to pick up a package from the automatic driving vehicle 1 that is stopping for a predetermined period, the time in which the recipient 5 is to pick up the package is restricted, and it is therefore desirable that the automatic driving vehicle 1 be parked or stopped in a place where parking is possible in the area indicated by the delivery destination. By adopting this configuration, a place where parking is possible can be preferentially extracted in the parking/stopping area that is the area indicated by the delivery destination, and notified to the recipient 5.

It should be noted that a configuration is adopted in which, in a case where it has been determined by the parking viability determination unit 32 that it is not possible for the automatic driving vehicle 1 to park at the first planned parking/stopping location, and notification information indicating that it is possible to stop for a predetermined period only has been transmitted to the recipient terminal 2, the movement control unit 21 causes the automatic driving vehicle 1 to move to the first planned parking/stopping location and to stop for the predetermined period. By adopting this configuration, the automatic driving vehicle 1 does not unlawfully park at the first planned parking/stopping location.

It should be noted that the processing (S1 to S11) of the flowchart depicted in FIG. 13 is executed in a case where the location of the automatic driving vehicle 1 is within a range of a predetermined distance from the first planned parking/stopping location. This is because it is not necessary to execute the processing of the flowchart depicted in FIG. 13 in a case where the automatic driving vehicle 1 is in a location far away from the first planned parking/stopping location. By adopting this configuration, it is possible to reduce the processing load required for the aforementioned processing.

It should be noted that embodiment 1 had a configuration in which the planned parking/stopping location of the automatic driving vehicle 1 is changed in a case where it has been determined by the parking/stopping viability determination unit 24 that it is not possible for the automatic driving vehicle 1 to park or stop at the first planned parking/stopping location. Instead of this configuration, a configuration may be adopted in which, in a case where the photographed object is a vehicle (an example of a mobile body), and it has been determined that it is not possible for the automatic driving vehicle 1 to park or stop at the first planned parking/stopping location due to a first nonviable parking/stopping area decided due to that vehicle, the planned parking/stopping location of the automatic driving vehicle 1 is not changed, and the movement of the automatic driving vehicle 1 is controlled in such a way that the automatic driving vehicle 1 once again arrives at the first planned parking/stopping location after a predetermined period has elapsed. With this configuration, the movement control unit 21 sets a route that constitutes a closed loop in which the first planned parking/stopping location serves as the departure point and the destination, and controls the movement of the automatic driving vehicle 1 on the basis of the set route.

Figure 19:
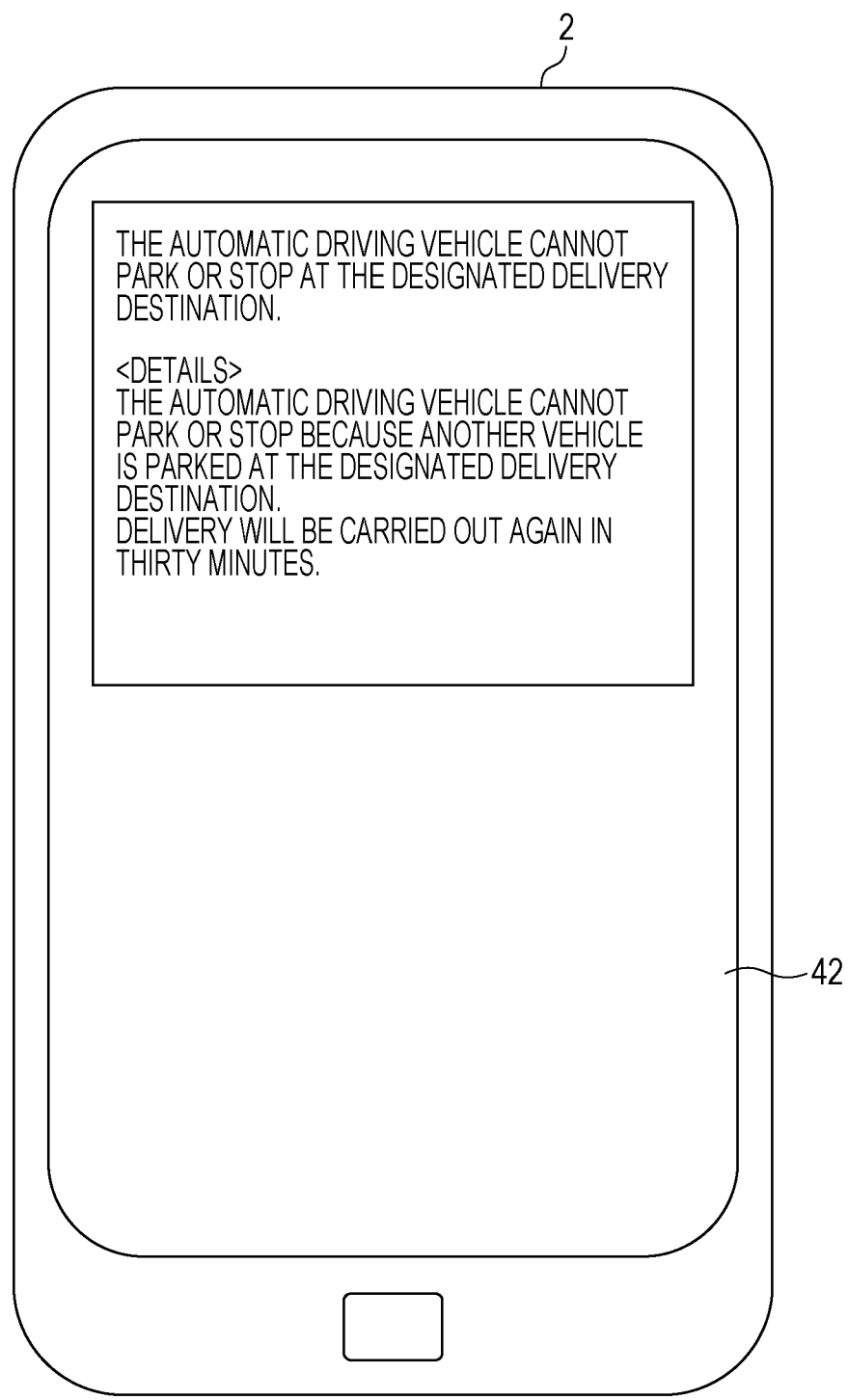
FIG. 19 is a diagram depicting display example 4 of notification information in the recipient terminal according to embodiment 1.

Furthermore, on the basis of the route set as mentioned above, it is possible to calculate the movement time of the automatic driving vehicle 1. In addition, on the basis of this movement time, it is possible to calculate the time at which the automatic driving vehicle 1 will once again arrive at the first planned parking/stopping location. By adopting this configuration, it is possible for the package to be delivered to the delivery destination designated by the recipient 5, without changing the planned parking/stopping location of the automatic driving vehicle 1. It should be noted that, for this configuration, a configuration is preferable in which the arrival time of the automatic driving vehicle 1 is changed, and, once again, notification information indicating that the package is to be delivered is transmitted to the recipient terminal 2. FIG. 19 is a diagram depicting display example 4 of notification information in the recipient terminal 2 according to embodiment 1. In the example depicted in FIG. 19, the message "Delivery will be carried out again in thirty minutes." is displayed on the display unit 42 of the recipient terminal 2 as the aforementioned notification information. By adopting this configuration, the recipient 5 is able to recognize that the package will be delivered once again. It should be noted that, in this case, a configuration is preferable in which notification information indicating the reason for the package being delivered once again is also transmitted to the recipient terminal 2. In the example depicted in FIG. 19, the message "The automatic driving vehicle cannot park or stop because another vehicle is parked at the designated delivery destination." is displayed on the display unit 42 of the recipient terminal 2 as the aforementioned notification information. By adopting this configuration, the recipient 5 is able to know the reason for the package being delivered once again.

It should be noted that a configuration may be adopted in which some or all of the constituent elements from among the control unit 16 and the storage unit 17 of the automatic driving vehicle 1 of embodiment 1 are arranged in an external device (a control device) such as a server and the automatic driving vehicle 1 is controlled by the external device. With this configuration, necessary information is exchanged between the automatic driving vehicle 1 and the external device. For example, photographic images that have been photographed by the imaging units 12 of the automatic driving vehicle 1 may be transmitted to the external device, and a photographed object may be identified based on the photographic images by the external device.

Embodiment 2

2-1. Functional Configuration of Automatic Driving Vehicle

Figure 20:
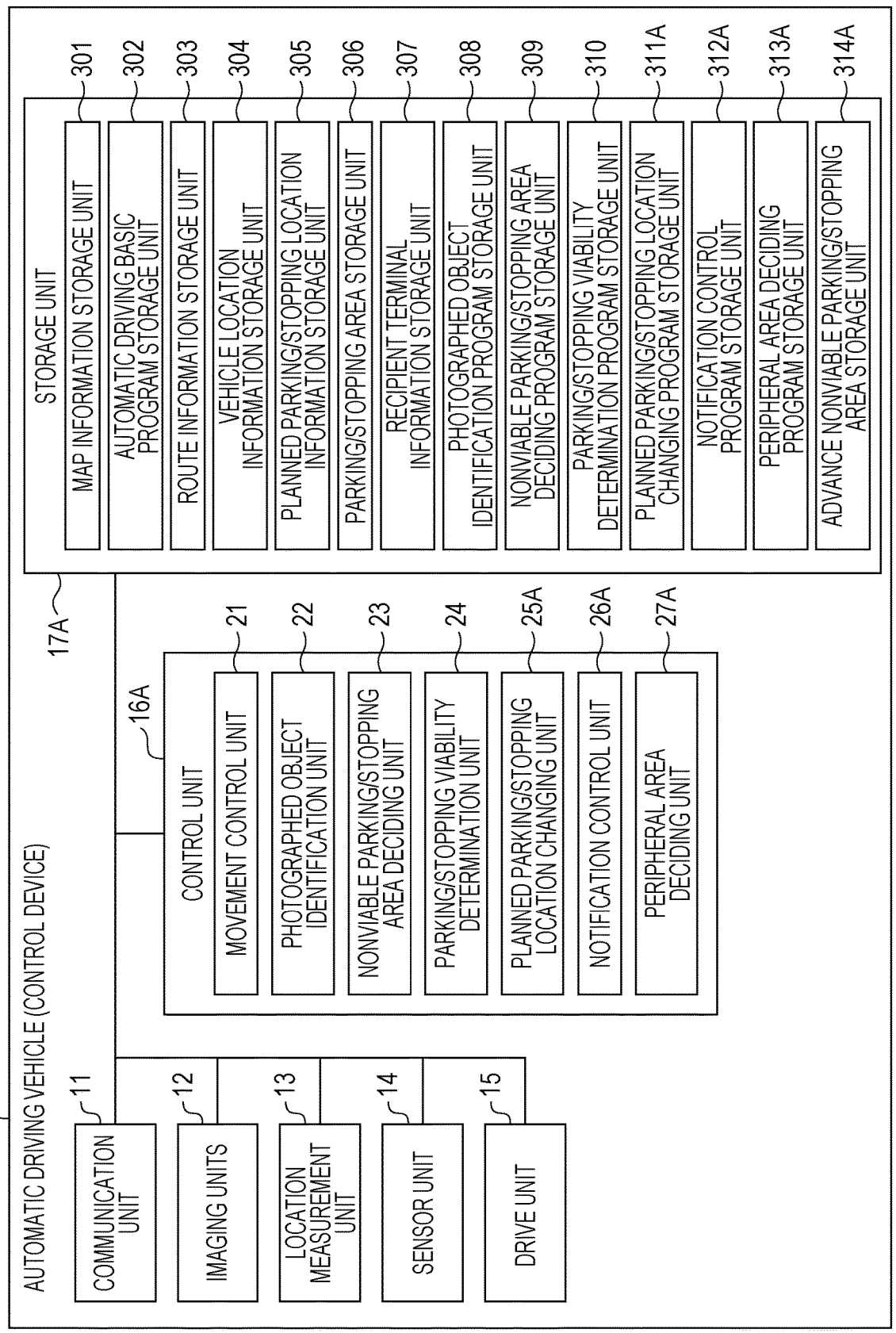
FIG. 20 is a block diagram depicting a functional configuration of an automatic driving vehicle according to embodiment 2.

Next, a functional configuration of an automatic driving vehicle 1A (a control device of the automatic driving vehicle 1A) according to embodiment 2 will be described with reference to FIG. 20. FIG. 20 is a block diagram depicting the functional configuration of the automatic driving vehicle 1A according to embodiment 2. It should be noted that, in the present embodiment, constituent elements that are the same as those of the aforementioned embodiment 1 are denoted by the same reference numbers, and descriptions thereof are omitted.

As depicted in FIG. 20, in the automatic driving vehicle 1A, a control unit 16A and a storage unit 17A are different from the automatic driving vehicle 1 depicted in FIG. 2.

In the control unit 16A, a planned parking/stopping location changing unit 25A, a notification control unit 26A, and a peripheral area deciding unit 27A are different from the control unit 16 of the automatic driving vehicle 1 depicted in FIG. 2.

Figure 21:
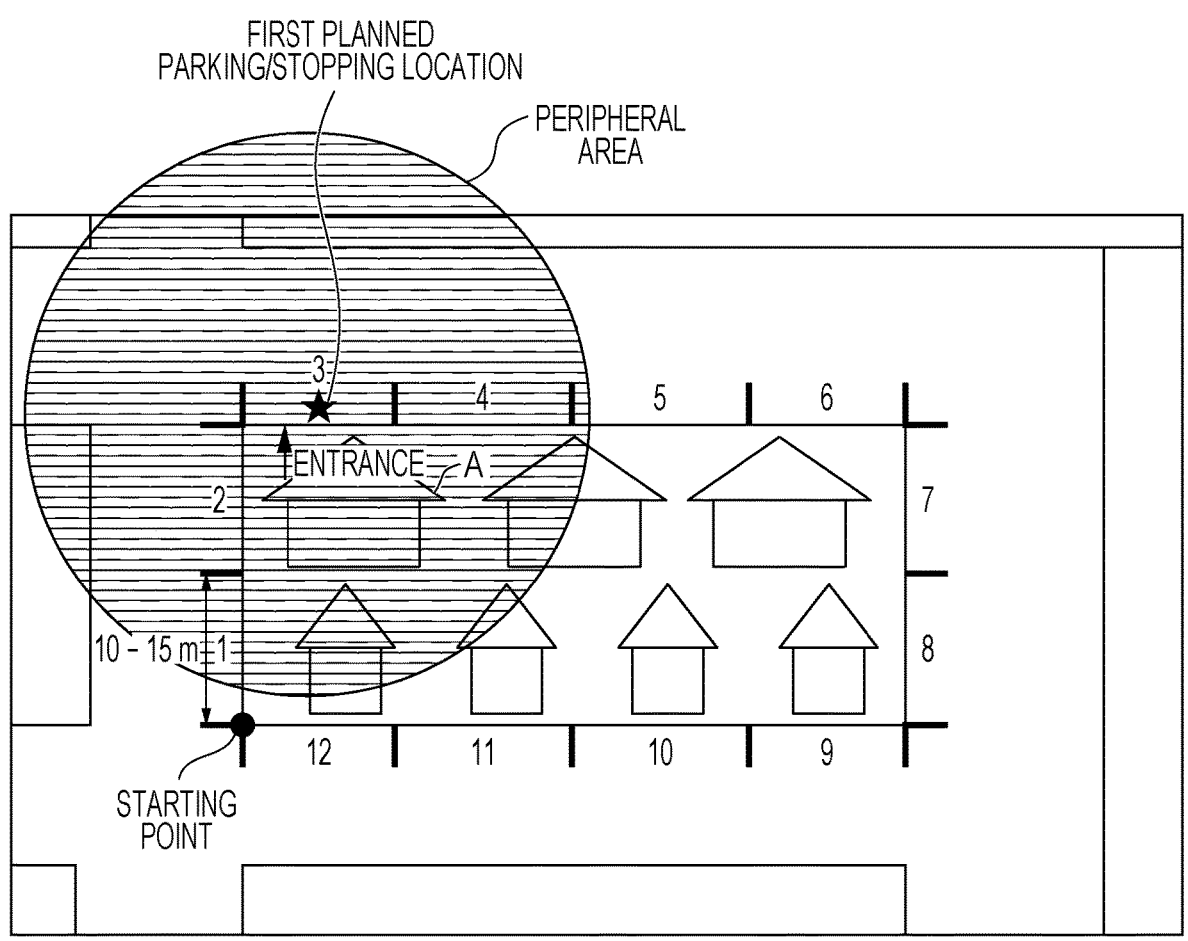
FIG. 21 is a diagram depicting example 1 of a peripheral area of the first planned parking/stopping location.

In a case where it has been determined by the parking/stopping viability determination unit 24 that it is not possible for the automatic driving vehicle 1A to park or stop at the first planned parking/stopping location, the peripheral area deciding unit 27A decides a peripheral area of the first planned parking/stopping location on the basis of the first planned parking/stopping location and a peripheral area deciding rule that is decided in advance. The peripheral area deciding rule may be an arbitrary rule. FIG. 21 is a diagram depicting example 1 of a peripheral area of the first planned parking/stopping location. In the example of a peripheral area deciding rule depicted in FIG. 21, an area within a predetermined distance from the first planned parking/stopping location is decided as a peripheral area. In FIG. 21, a star mark represents the first planned parking/stopping location, and the horizontal line area represents the peripheral area of the first planned parking/stopping location. It should be noted that, since it is necessary for the first planned parking/stopping location to be a location that can be reached by the automatic driving vehicle 1A, a configuration is preferable in which a range that can be reached by the automatic driving vehicle 1A is decided as the peripheral area of the first planned parking/stopping location, within the horizontal line area depicted in FIG. 21. A range that can be reached by the automatic driving vehicle 1A is constituted by roads, for example. It should be noted that, in a case where an area, other than a road, in which it is possible for the automatic driving vehicle 1A to travel has been determined in advance, that area can also be set as range that can be reached by the automatic driving vehicle 1A.

Figure 22:
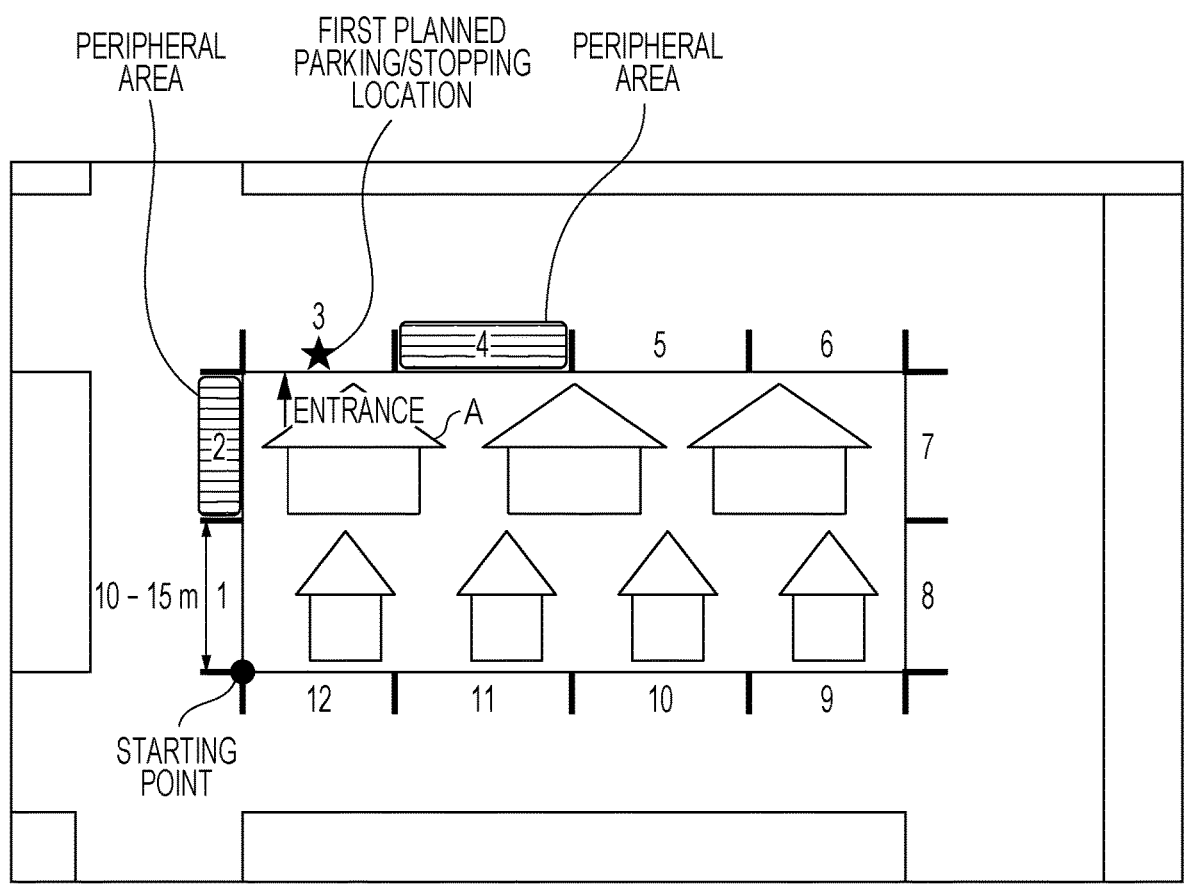
FIG. 22 is a diagram depicting example 2 of a peripheral area of the first planned parking/stopping location.

FIG. 22 is a diagram depicting example 2 of a peripheral area of the first planned parking/stopping location. In the example of a peripheral area deciding rule depicted in FIG. 22, in a case where the delivery destination designated by the recipient 5 is an address, the addresses "2" and "4" that are adjacent on both sides of the address "3" that is the delivery destination are decided as peripheral areas. In FIG. 22, a star mark represents the first planned parking/stopping location, and the horizontal line areas represent the peripheral areas of the first planned parking/stopping location.

In a case where it is determined by the parking/stopping viability determination unit 24 that it is not possible for the automatic driving vehicle 1A to be parked or stopped at the first planned parking/stopping location, the planned parking/stopping location changing unit 25A changes the planned parking/stopping location of the automatic driving vehicle 1A on the basis of a peripheral area of the first planned parking/stopping location decided by the peripheral area deciding unit 27A and an advance nonviable parking/stopping area (a second nonviable parking/stopping area) stored in an advance nonviable parking/stopping area storage unit 314A (described later on). For example, in a case where an area other than the second nonviable parking/stopping area is extracted within a peripheral area, and it is determined that the size of the extracted area other than the second nonviable parking/stopping area is larger than a predetermined threshold value, the planned parking/stopping location changing unit 25A changes the planned parking/stopping location of the automatic driving vehicle 1A from the first planned parking/stopping location to the second planned parking/stopping location in the aforementioned area. Alternatively, in a case where an area other than the second nonviable parking/stopping area is extracted within a peripheral area, and it is determined that it is possible to arrange a graphic having a predetermined size (for example, a graphic having a size corresponding to the size of the automatic driving vehicle 1A) in the extracted area, the planned parking/stopping location changing unit 25A may change the planned parking/stopping location of the automatic driving vehicle 1A from the first planned parking/stopping location to the second planned parking/stopping location in the aforementioned area.

It should be noted that, in a case where there are a plurality of extracted areas other than the second nonviable parking/stopping area, for example, the planned parking/stopping location changing unit 25A may determine whether or not the plurality of extracted areas are appropriate as the second planned parking/stopping location, sequentially from the area that is closest to the first planned parking/stopping location, and may decide a location in the area first determined as being appropriate as the second planned parking/stopping location. By adopting this configuration, the planned parking/stopping location can be changed to a location that is closest to the delivery destination designated by the recipient 5.

Alternatively, in a case where there are a plurality of extracted areas other than the second nonviable parking/stopping area, the planned parking/stopping location changing unit 25A may determine whether or not the plurality of extracted areas are appropriate as the second planned parking/stopping location, sequentially from the area having the shortest movement distance from the present location of the automatic driving vehicle 1A, and may decide a location in the area first determined as being appropriate as the second planned parking/stopping location. By adopting this configuration, the planned parking/stopping location can be changed to the location that is closest to the location of the automatic driving vehicle 1A.

In a case where the planned parking/stopping location has been changed by the planned parking/stopping location changing unit 25A, the notification control unit 26A generates notification information indicating that it is not possible for the automatic driving vehicle 1A to park or stop at the delivery destination, and transmits the generated notification information to the recipient terminal 2.

In the storage unit 17a, a planned parking/stopping location changing program storage unit 311A, a notification control program storage unit 312A, a peripheral area deciding program storage unit 313A, and the advance nonviable parking/stopping area storage unit 314A are different from the storage unit 17 of the automatic driving vehicle 1 depicted in FIG. 2.

The planned parking/stopping location changing program storage unit 311A stores a planned parking/stopping location changing program for changing the planned parking/stopping location. The planned parking/stopping location changing program is executed by the planned parking/stopping location changing unit 25A.

The notification control program storage unit 312A stores a notification control program for generating notification information and transmitting the notification information to the recipient terminal 2. The notification control program is executed by the notification control unit 26A.

The peripheral area deciding program storage unit 313A stores a peripheral area deciding program for deciding a peripheral area of the first planned parking/stopping location. The peripheral area deciding program is executed by the peripheral area deciding unit 27A. The peripheral area deciding program includes peripheral area deciding rules with which a peripheral area is decided based on the first planned parking/stopping location.

The advance nonviable parking/stopping area storage unit 314A stores an advance nonviable parking/stopping area (the second nonviable parking/stopping area) that is decided in advance as an area in which parking or stopping of the automatic driving vehicle 1A is prohibited, on the basis of map information and a law relating to the prohibition of parking or stopping (for example, the Road Traffic Act, Article 44) (an example of a regulation). Here, the difference between the second nonviable parking/stopping area and the first nonviable parking/stopping area decided by the nonviable parking/stopping area deciding unit 23 will be described. The first nonviable parking/stopping area is decided based on a photographed object that is photographed by the imaging units 12 of the automatic driving vehicle 1A, whereas the second nonviable parking/stopping area is decided in advance on the basis of map information. Although it is thought that a first nonviable parking/stopping area decided according to the aforementioned nonviable parking/stopping area setting rules has many portions that overlap with a second nonviable parking/stopping area, there are also portions that do not overlap. For example, in a case where a road, facility, or the like has been newly constructed, or in a case where a road, facility, or the like has been changed, it is highly unlikely that the map information will always be updated in real time. Therefore, there are cases where the updating of the map information in these places is late, and in these places it is not possible to generate a second nonviable parking/stopping area on the basis of map information. Furthermore, depending on the map information, a case is also feasible where the information necessary for deciding a second nonviable parking/stopping area (for example, information relating to the locations of bus stop display posts) on the basis of the stipulations of the Road Traffic Act, Article 44, is not included, and it is not possible to generate a second nonviable parking/stopping area from map information in this case also. In this way, since a second nonviable parking/stopping area that can be generated from the map information is not always necessarily sufficient, it is necessary to decide a first nonviable parking/stopping area according to a photographed object photographed by the imaging units 12 of the automatic driving vehicle 1A.

In the present embodiment, the advance nonviable parking/stopping area was decided in advance on the basis of map information and a law relating to the prohibition of parking or stopping; however, it should be noted that there is no restriction thereto, and the advance nonviable parking/stopping area may be decided in advance on the basis of map information and a regulation relating to the prohibition of parking or stopping on private land (for example, a theme park or the like).

2-2. Operation of Automatic Driving Vehicle

Figure 23B:
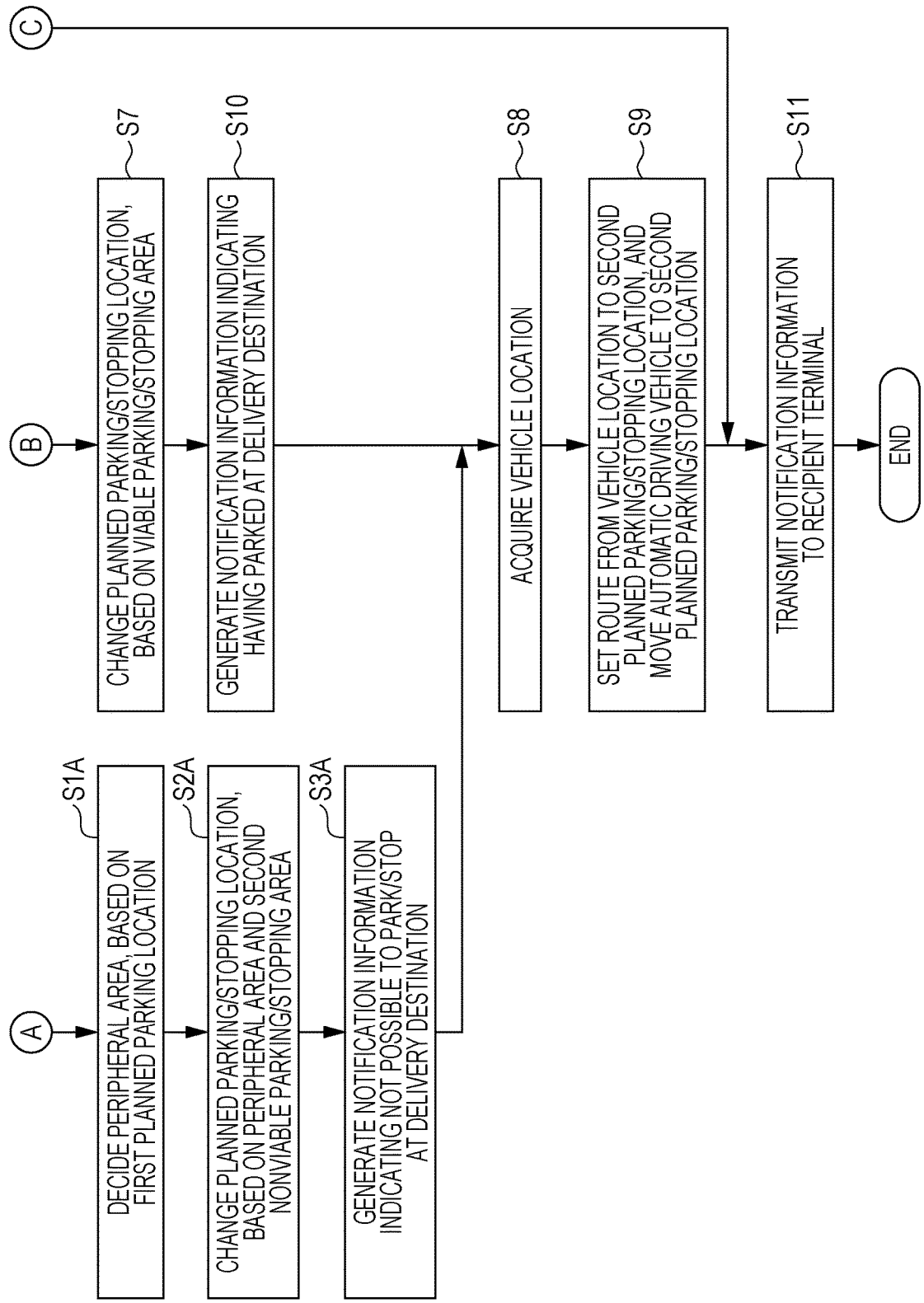

Next, an operation of the automatic driving vehicle 1A will be described with reference to FIGS. 23A and 23B. FIGS. 23A and 23B are a flowchart depicting the flow of an operation of the automatic driving vehicle 1A according to embodiment 2. It should be noted that, in the flowchart depicted in FIGS. 23A and 23B, steps that are the same as those in the flowchart depicted in FIG. 13 are denoted by the same step numbers, and descriptions thereof are omitted.

In the flowchart depicted in FIGS. 23A and 23B, the steps of S1A, S2A, and S3A are different from the flowchart depicted in FIG. 13.

First, similar to the aforementioned embodiment 1, steps S1 to S4 are executed. Thereafter, in step S6, in a case where the parking/stopping viability determination unit 24 has not been able to extract a viable parking/stopping area other than the first nonviable parking/stopping area within the parking/stopping area, in other words, in a case where it has been determined that it is not possible for the automatic driving vehicle 1A to be parked or stopped within the parking/stopping area, the peripheral area deciding unit 27A decides a peripheral area of the first planned parking/stopping location on the basis of the first planned parking/stopping location (S1A).

Next, the planned parking/stopping location changing unit 25A changes the planned parking/stopping location of the automatic driving vehicle 1A from the first planned parking/stopping location to the second planned parking/stopping location on the basis of the peripheral area decided by the peripheral area deciding unit 27A and the second nonviable parking/stopping area stored in the advance nonviable parking/stopping area storage unit 314A (S2A).

Figure 24:
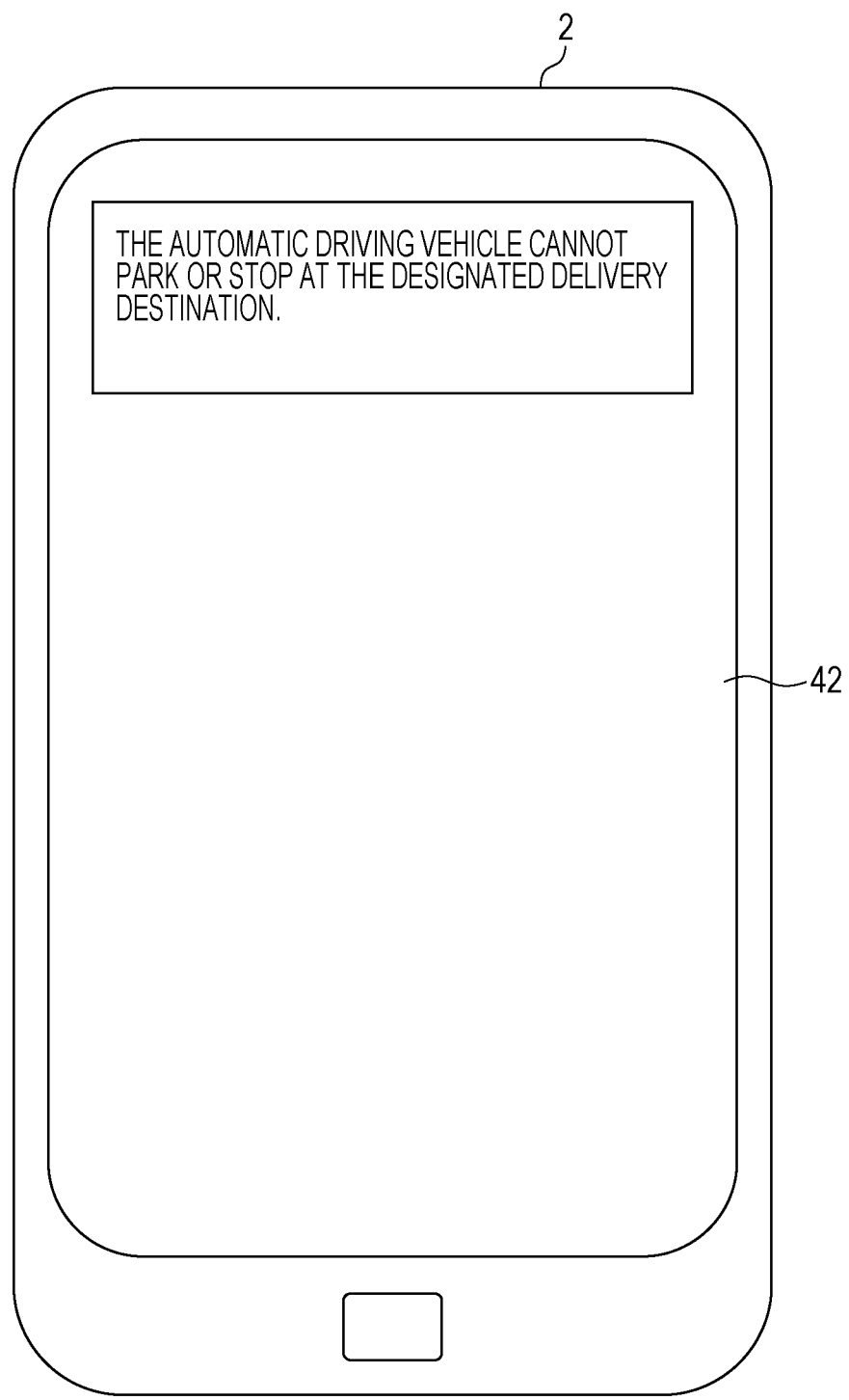
FIG. 24 is a diagram depicting display example 1 of notification information in a recipient terminal according to embodiment 2.

Next, the notification control unit 26A generates notification information indicating that the automatic driving vehicle 1A cannot park or stop at the delivery destination (S3A). By means of this notification information, the recipient 5 can be notified that the automatic driving vehicle 1A cannot park or stop in the parking/stopping area. FIG. 24 is a diagram depicting display example 1 of notification information in the recipient terminal 2 according to embodiment 2. In the example depicted in 24, the message "The automatic driving vehicle cannot park or stop at the designated delivery destination." is displayed on the display unit 42 of the recipient terminal 2 as notification information indicating that the automatic driving vehicle 1A cannot park or stop at the delivery destination.

2-3. Effects

According to the above processing, in a case where it is determined that it is not possible for the automatic driving vehicle 1A to be parked or stopped at the first planned parking/stopping location, the planned parking/stopping location of the automatic driving vehicle 1A is changed to a place where parking or stopping is possible within the peripheral area of the first planned parking/stopping location, thereby enabling the automatic driving vehicle 1A to be moved to the planned parking/stopping location that has been changed. As a result, the package can be delivered in accordance with the intention of the recipient 5 to the extent possible.

2-4. Modified Example

In embodiment 2, in a case where it has been determined that it is not possible for the automatic driving vehicle 1A to be parked or stopped at the first planned parking/stopping location (S4), a viable parking/stopping area was extracted from the parking/stopping area (S6); however, a configuration may be adopted in which this step S6 is omitted, and the planned parking/stopping location of the automatic driving vehicle 1A is changed to a place where parking or stopping is possible within the peripheral area of the first planned parking/stopping location. With this configuration, a configuration is preferable in which processing is carried out to change the planned parking/stopping location with the parking/stopping area being prioritized, within the peripheral area of the first planned parking/stopping location. By adopting this configuration, the package can be delivered in accordance with the intention of the recipient 5 to the extent possible.

Furthermore, embodiment 2 had a configuration in which the notification control unit 26A generates notification information indicating that the automatic driving vehicle 1A cannot be parked or stopped at the delivery destination, and the notification information is transmitted to the recipient terminal 2; however, a configuration may be adopted in which notification information indicating that the planned parking/stopping location of the automatic driving vehicle 1A has been changed is generated and transmitted to the recipient terminal 2.

Figure 25:
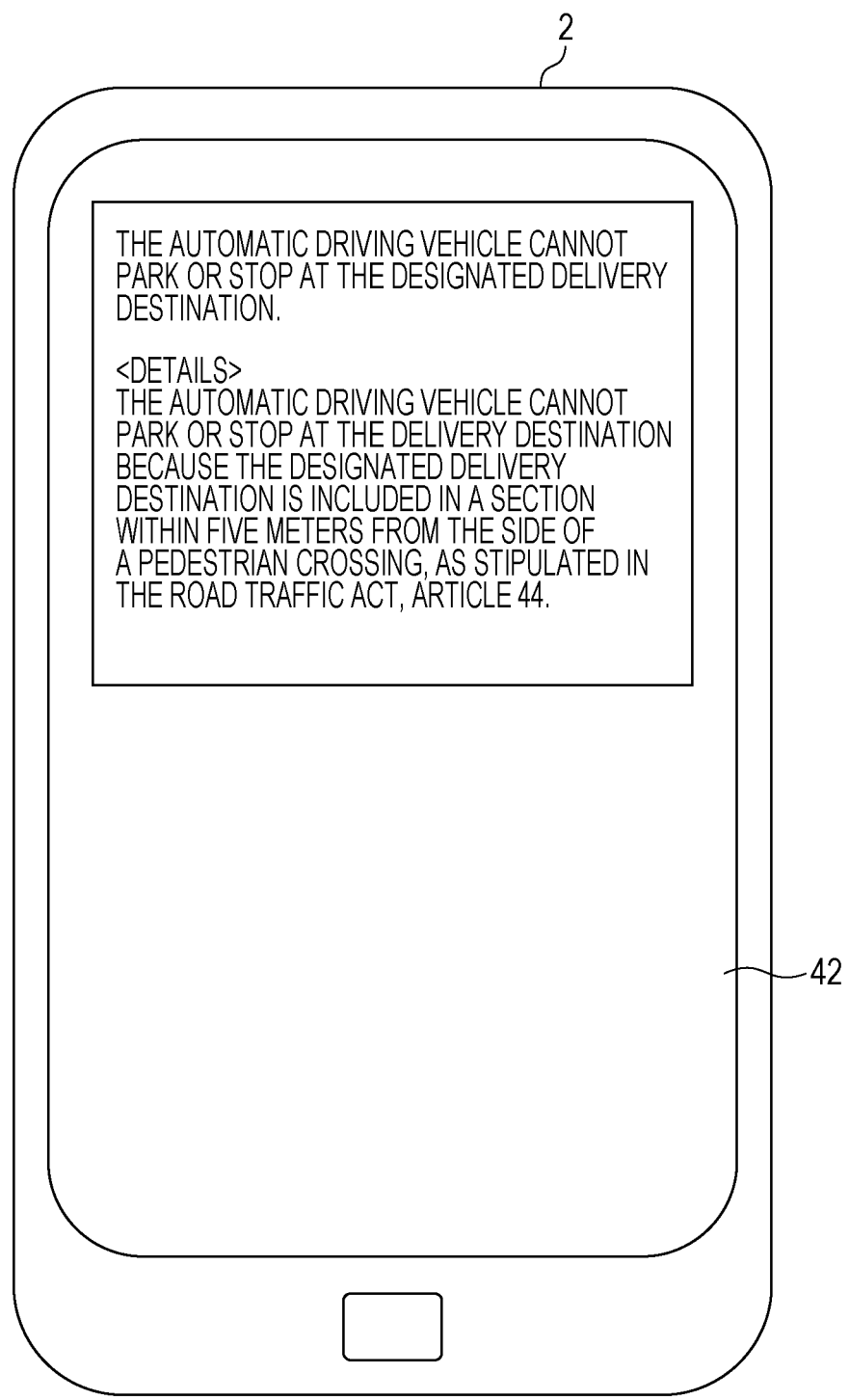
FIG. 25 is a diagram depicting display example 2 of notification information in the recipient terminal according to embodiment 2.

Furthermore, embodiment 2 had a configuration in which, in step S3, the notification control unit 26A generates notification information indicating that the automatic driving vehicle 1A cannot be parked or stopped at the delivery destination, and the notification information is transmitted to the recipient terminal 2; however, a configuration may be adopted in which, in addition, notification information indicating the reason for the automatic driving vehicle 1A not being able to park or stop at the delivery destination is generated and transmitted to the recipient terminal 2. FIG. 25 is a diagram depicting display example 2 of notification information in the recipient terminal 2 according to embodiment 2. In the example depicted in 25, the message "The automatic driving vehicle cannot park or stop at the delivery destination because the designated delivery destination is included in a section within five meters from the side of a pedestrian crossing, as stipulated in the Road Traffic Act, Article 44." is displayed on the display unit 42 of the recipient terminal 2 as notification information indicating the reason for the automatic driving vehicle 1A not being able to park or stop at the delivery destination. By adopting this configuration, the recipient 5 is able to know the reason for the automatic driving vehicle 1A not being able to park or stop at the delivery destination, and, next time, is able to refer to this notification information if ordering a delivery by means of the automatic driving vehicle 1A. It should be noted that the notification control unit 26A may generate notification information indicating the reason for the parking/stopping location of the automatic driving vehicle 1A having been changed (an example of second notification information), instead of the reason for the automatic driving vehicle 1A not being able to park or stop at the delivery destination.

Figure 26:
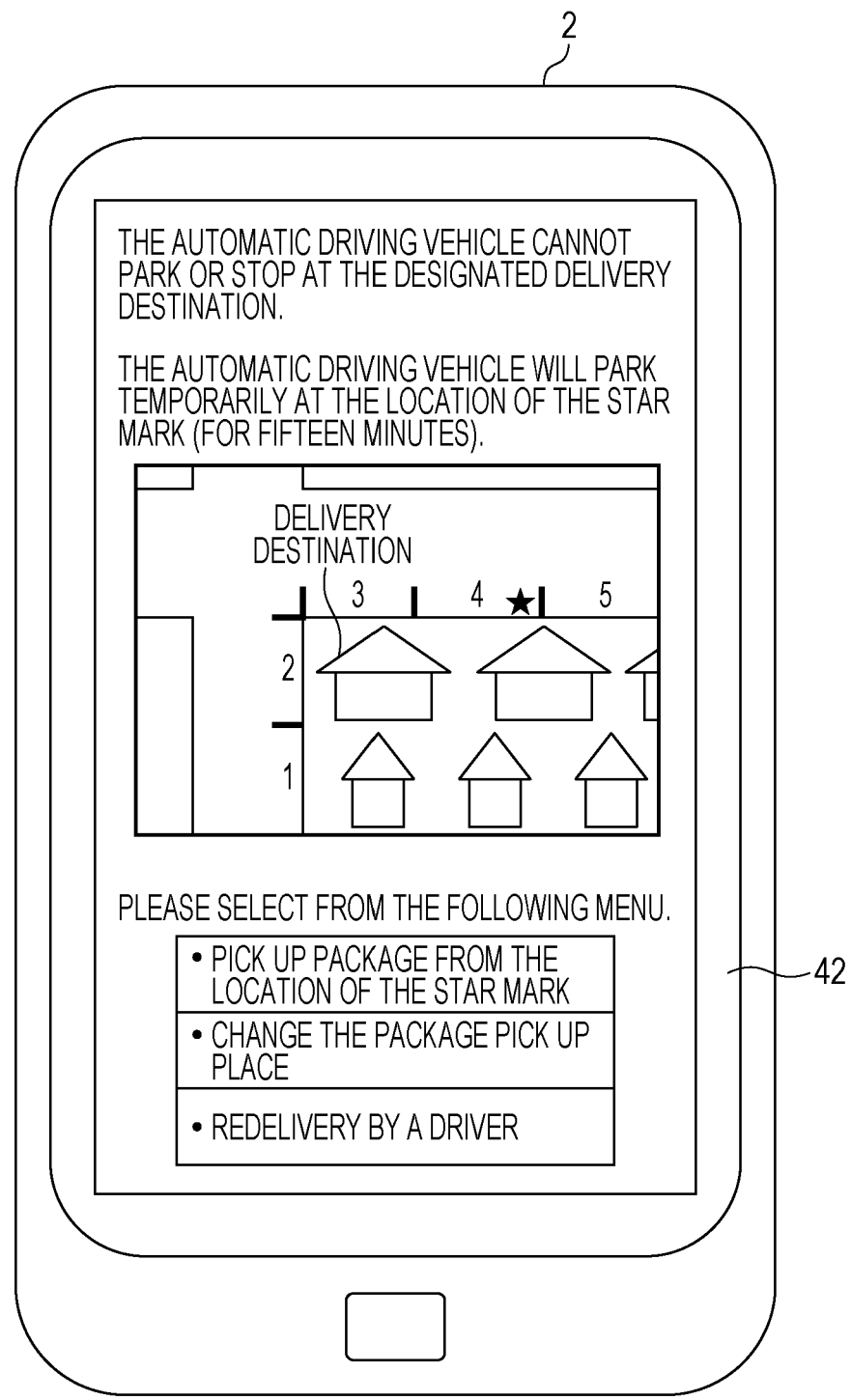
FIG. 26 is a diagram depicting display example 3 of notification information in the recipient terminal according to embodiment 2.

Furthermore, a configuration may be adopted in which the notification control unit 26A, in addition, generates notification information indicating query information for the recipient 5 regarding the way in which the delivery method is to be changed (selected) (in other words, prompting the recipient 5 to select a delivery method for the package) (an example of fifth notification information), and the notification information is transmitted to the recipient terminal 2. FIG. 26 is a diagram depicting display example 3 of notification information in the recipient terminal 2 according to embodiment 2. In the example depicted in FIG. 26, delivery method options (pick up package at the location of the star mark, change the package pick up place, and redelivery by a driver) are displayed on the display unit 42 of the recipient terminal 2 as the notification information indicating query information for the recipient 5 regarding the way in which the delivery method is to be changed. Information relating to the delivery method selected by the recipient 5 is transmitted from the recipient terminal 2 to the automatic driving vehicle 1A. The automatic driving vehicle 1A thereby controls the movement of the automatic driving vehicle 1A on the basis of selection information relating to the delivery method received from the recipient terminal 2.

For example, in a case where the recipient 5 has selected the "pick up package at the location of the star mark" option, the automatic driving vehicle 1A continues to park at the location of the star mark depicted in FIG. 26. Furthermore, in a case where the recipient 5 has selected the "change the package pick up place" option, the automatic driving vehicle 1A once again decides the second planned parking/stopping location from the peripheral area of the first planned parking/stopping location, and transmits the decided second planned parking/stopping location to the recipient terminal 2 as a delivery destination place change candidate. In a case where the second planned parking/stopping location has been decided as a delivery destination place change by the recipient terminal 2, the movement control unit 21 causes the automatic driving vehicle 1A to move to the second planned parking/stopping location. Furthermore, in a case where the recipient 5 has selected the "redelivery by a driver" option, it is necessary for the package loaded onto the automatic driving vehicle 1A to be moved to a vehicle used by a driver, and therefore, for example, the automatic driving vehicle 1A is made to move to a predetermined location such as a collection/delivery site of a delivery center. According to the above configuration, the recipient 5 is able to designate a desired delivery method on the basis of the query information displayed on the recipient terminal 2.

Furthermore, in embodiment 2, a configuration was adopted in which, in a case where it has been determined that it is possible for the automatic driving vehicle 1A to park or stop at the first planned parking/stopping location, the notification control unit 26A generates notification information indicating that the automatic driving vehicle 1A has parked at the first planned parking/stopping location that is the delivery destination. Here, a configuration may be adopted in which, in a case where the planned parking/stopping location of the automatic driving vehicle 1A has been changed, the notification control unit 26A generates notification information indicating that the automatic driving vehicle 1A has parked at the second planned parking/stopping location.

Furthermore, in embodiment 2, a configuration was adopted in which, in a case where it has been determined by the parking/stopping viability determination unit 24 that it is not possible for the automatic driving vehicle 1 to park or stop at the first planned parking/stopping location, the planned parking/stopping location is changed to a location where parking or stopping is possible, within the peripheral area of the first planned parking/stopping location. Here, in a case where a planned parking/stopping list indicating a plurality of planned parking/stopping locations at which it is planned for the automatic driving vehicle 1A to sequentially park or stop has been stored in advance in the storage unit 17A, and it has been determined by the parking/stopping viability determination unit 24 that it is not possible for the automatic driving vehicle 1A to be parked or stopped at the first planned parking/stopping location, the planned parking/stopping location changing unit 25 may decide, as the second planned parking/stopping location, a planned parking/stopping location at which it is planned for the automatic driving vehicle 1A to park or stop after the first planned parking/stopping location from within the plurality of planned parking/stopping locations. By adopting this configuration, the planned parking/stopping location of the automatic driving vehicle 1A can be changed by means of a simple configuration, and a package can be delivered by the automatic driving vehicle 1A at the planned time to a planned parking/stopping location other than the first planned parking/stopping location.

At such time, the parking/stopping viability determination unit 24 may determine whether or not it is possible to change the planned parking/stopping location of the automatic driving vehicle 1A in the parking/stopping area. A configuration may be adopted in which, only in a case where it has been determined by the parking/stopping viability determination unit 24 that it is not possible for the parking/stopping location to be changed, the planned parking/stopping location changing unit 25A changes a planned parking/stopping location of the automatic driving vehicle 1A to the next second planned parking/stopping location. By adopting this configuration, a planned parking/stopping location can be changed from the next sequential second planned parking/stopping location with locations where parking or stopping in the parking/stopping area is possible being prioritized.

Furthermore, the notification control unit 26A may transmit notification information including: information indicating that the package cannot be delivered to the first planned parking/stopping location; and information for issuing a query to the recipient 5 regarding the way in which the delivery method is to be changed, to the recipient terminal 2 for the delivery destination of the first planned parking/stopping location where it has been determined that parking or stopping is not possible. In this case, a configuration may be adopted in which the automatic driving vehicle 1A receives a response from the recipient terminal 2 while moving to the next second planned parking/stopping location, and decides the movement control method on the basis of the received response. By adopting this configuration, the automatic driving vehicle 1A is able to decide the movement control method on the basis of a response from the recipient terminal 2 for the delivery destination of the first planned parking/stopping location where it has been determined that parking or stopping is not possible, while moving to the second planned parking/stopping location that is the next delivery destination, and is therefore able to carry out the delivery efficiently.

Furthermore, a configuration may be adopted in which, in a case where it has been determined that it is not possible for the automatic driving vehicle 1A to park or stop at the first planned parking/stopping location because another vehicle is parked at the first planned parking/stopping location, the first planned parking/stopping location is changed to the second planned parking/stopping location that is the next delivery destination, and the delivery order for the first planned parking/stopping location where it has been determined that parking or stopping is not possible is changed. By adopting this configuration, by simply changing the delivery order for the first planned parking/stopping location where it has been determined that parking or stopping is not possible, it becomes unnecessary for the first planned parking/stopping location to be changed.

Furthermore, a configuration may be adopted in which, in a case where the delivery order of a plurality of planned parking/stopping locations and delivery times in each planned parking/stopping location are predetermined, it has been determined by the parking/stopping viability determination unit 24 that it is not possible for the automatic driving vehicle 1A to park or stop at the first planned parking/stopping location, and it has been determined that there is time to spare until arriving at the next second planned parking/stopping location, the planned parking/stopping location is changed to a location where parking or stopping is possible, and the automatic driving vehicle 1A is parked or stopped at the planned parking/stopping location that has been changed. By adopting this configuration, the recipient is able to receive the package at the planned parking/stopping location that has been changed, and the package can be delivered without being late for the delivery time for the first planned parking/stopping location that has been planned.

Furthermore, embodiment 2 had a configuration in which the planned parking/stopping location changing unit 25A changes the planned parking/stopping location of the automatic driving vehicle 1A on the basis of the peripheral area of the first planned parking/stopping location and the second nonviable parking/stopping area; however, a configuration may be adopted in which the planned parking/stopping location of the automatic driving vehicle 1A is changed with additional consideration also being given to an advance nonviable parking/stopping area that is decided in advance in accordance with map information and a law or the like. By adopting this configuration, the planned parking/stopping location can be changed in an area in which parking is possible, within the peripheral area of the first planned parking/stopping location.

Furthermore, a configuration may be adopted in which, in a case where it has not been possible for the planned parking/stopping location of the automatic driving vehicle 1A to be changed in the peripheral area of the first planned parking/stopping location by the planned parking/stopping location changing unit 25A, the peripheral area deciding unit 27A carries out processing to enlarge (change) the peripheral area of the first planned parking/stopping location, and the planned parking/stopping location changing unit 25A carries out processing to once again change the planned parking/stopping location of the automatic driving vehicle 1A in the enlarged peripheral area. By adopting this configuration, the planned parking/stopping location of the automatic driving vehicle 1A can be reliably changed in the peripheral area of the first planned parking/stopping location.

Other Modified Examples

Hereinabove, a control device and the like for an automatic driving vehicle according to one or more aspects has been described based on the aforementioned embodiments; however, the present disclosure is not restricted to the aforementioned embodiments. Modes in which various modifications conceived by a person skilled in the art have been implemented in the embodiments and modified examples, and modes constructed by combining the constituent elements in different embodiments and modified examples may also be included within the scope of one or more aspects provided they do not depart from the purpose of the present disclosure. For example, the aforementioned embodiments and modified examples may be combined.

For example, in the aforementioned embodiments, the imaging units 12 were configured in such a way as to be mounted on the automatic driving vehicle 1; however, there is no restriction thereto, and the imaging units 12 may be security cameras installed, for example, on the roadside or the like.

It should be noted that, in the aforementioned embodiments, the constituent elements may be configured by using dedicated hardware, or may be realized by executing a software program suitable for the constituent elements. The constituent elements may be realized by a program execution unit such as a CPU or a processor reading out and executing a software program recorded in a recording medium such as a hard disk or a semiconductor memory.

Some or all of the functions of a control device of the automatic driving vehicles 1 and 1A according to embodiments 1 and 2 are typically realized as an LSI (large scale integration), which is an integrated circuit. These may be implemented separately as single chips, or may be implemented as a single chip in such a way as to include some or all of the functions. Furthermore, the circuit integration is not restricted to an LSI, and the functions may be realized using a dedicated circuit or a general-purpose processor. After an LSI has been manufactured, an FPGA (field-programmable gate array) that can be programmed, or a reconfigurable processor with which the connections and settings of circuit cells within the LSI can be reconfigured, may be used.

Furthermore, some or all of the functions of a control device of the automatic driving vehicles 1 and 1A according to embodiments 1 and 2 may be realized by a processor such as a CPU executing a program.

Furthermore, the numerals used hereinabove are all examples for explaining the present disclosure in a specific manner, and the present disclosure is not limited to the numerals given as examples.

Furthermore, the order in which the steps in the flowcharts depicted in FIGS. 13, 23A, and 23B are executed is an exemplary order for describing the present disclosure in a specific manner, and may be an order other than the aforementioned provided a similar effect can be obtained. Furthermore, some of the steps may be executed at the same time as (in parallel with) other steps.

In addition, various modified examples obtained by implementing alterations that are within the scope and conceived by a person skilled in the art, with respect to the embodiments of the present disclosure are also included in the present disclosure provided they do not depart from the purpose of the present disclosure.

Some or all of the constituent elements that make up the aforementioned devices may be configured from an IC card or a single module that is able to be attached to and detached from the devices. The IC card or the module is a computer system configured from a microprocessor, a ROM, a RAM, and the like. The IC card or the module may include the aforementioned multi-functional LSI. The function of the IC card or the module is achieved by the microprocessor operating in accordance with a computer program. This IC card or this module may be tamper-resistant.

The present disclosure may be the methods indicated above. Furthermore, the present disclosure may be a computer program that realizes these methods by means of a computer, or a digital signal constituted from the computer program. Furthermore, the present disclosure may be obtained by the computer program or the digital signal being recorded on a computer-readable recording medium such as a flexible disk, a hard disk, a CD-ROM, an MO, a DVD, a DVD-ROM, a DVD-RAM, a BD (Blu-ray (registered trademark) disc), or a semiconductor memory, for example. Furthermore, the present disclosure may be the digital signal having been recorded on these recording mediums. Furthermore, the present disclosure may be obtained by the computer program or the digital signal being transmitted via a network represented by an electric telecommunication line, a wireless or wired telecommunication line, and the Internet, or by a data broadcast or the like. Furthermore, the present disclosure may be a computer system provided with a microprocessor and a memory, in which the memory stores the computer program and the microprocessor operates in accordance with the computer program. Furthermore, the present disclosure may be carried out by another independent computer system by means of the program or the digital signal being recorded on the recording medium and being transferred, or by means of the program or the digital signal being transferred by way of the network or the like.

The control device of the automatic driving vehicle according to the present disclosure is, for example, used in an online delivery system delivery method or the like in which the designation of a delivery method for a package carried out by an automatic driving vehicle is received.

What is claimed is:

1. A control method of an automatic driving vehicle, the control method comprising:
   acquiring a photographic image of a photographed object;
   identifying the photographed object, based on the photographic image;
   storing, in a memory, a first planned location as a planned location where the automatic driving vehicle is to park or stop;
   determining whether or not a mobile body is parked or stopped at the first planned location, based on a result of the identifying and the first planned location; and
   in a case where the mobile body is parked or stopped at the first planned location:
      setting a route from a vehicle location indicating a present location of the automatic driving vehicle to the first planned location; and
      controlling movement of the automatic driving vehicle, based on the route,
   wherein the route is to return to the first planned location after passing through a second planned location where the automatic driving vehicle is planned to park or stop next.

2. A computer-readable non-transitory recording medium including a program, the program, when executed by a computer, controlling an automatic driving vehicle and causing execution of operations, the operations comprising:
   acquiring a photographic image of a photographed object photographed;
   identifying the photographed object, based on the photographic image;
   storing, in a memory, a first planned location as a planned location where the automatic driving vehicle is to park or stop;
   determining whether or not a mobile body is parked or stopped at the first planned location, based on a result of the identifying and the first planned location; and
   in a case where the mobile body is parked or stopped at the first planned location:
      setting a route from a vehicle location indicating a present location of the automatic driving vehicle to the first planned location; and
      controlling movement of the automatic driving vehicle, based on the route,
   wherein the route is to return to the first planned location after passing through a second planned location where the automatic driving vehicle is planned to park or stop next.

3. A control device of an automatic driving vehicle, the control device comprising:
   processing circuitry; and
   a memory including at least one set of instructions that, when executed by the processing circuitry, causes the processing circuitry to perform operations including:
      acquiring a photographic image of a photographed object;

identifying the photographed object, based on the photographic image;

storing, in the memory, a first planned location as a planned location where the automatic driving vehicle is to park or stop;

determining whether or not a mobile body is parked or stopped at the first planned location, based on a result of the identifying and the first planned location; and in a case where the mobile body is parked or stopped at the first planned location:

setting a route from a vehicle location indicating a present location of the automatic driving vehicle to the first planned location; and controlling movement of the automatic driving vehicle, based on the route, wherein the route is to return to the first planned location after passing through a second planned location where the automatic driving vehicle is planned to park or stop next.

4. The control method according to claim 1, wherein the route is to return to the first planned location after a predetermined period has elapsed.

* * * * *